(12) United States Patent
Hashimoto et al.

(10) Patent No.: US 11,079,028 B2
(45) Date of Patent: Aug. 3, 2021

(54) VALVE DEVICE

(71) Applicant: DENSO CORPORATION, Kariya (JP)

(72) Inventors: Koji Hashimoto, Kariya (JP); Naohito Seko, Kariya (JP); Ryo Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/805,982

(22) Filed: Mar. 2, 2020

(65) Prior Publication Data

US 2020/0284362 A1 Sep. 10, 2020

(30) Foreign Application Priority Data

Mar. 6, 2019 (JP) .............................. JP2019-040766

(51) Int. Cl.
| | |
|---|---|
| *F16K 11/087* | (2006.01) |
| *F16K 5/20* | (2006.01) |
| *F01P 7/14* | (2006.01) |
| *F16K 31/12* | (2006.01) |
| *F16K 5/06* | (2006.01) |

(52) U.S. Cl.
CPC .......... *F16K 11/0876* (2013.01); *F01P 7/14* (2013.01); *F16K 5/201* (2013.01); *F16K 5/205* (2013.01); *F16K 11/0873* (2013.01); *F01P 2007/146* (2013.01); *F16K 5/0605* (2013.01); *F16K 31/12* (2013.01)

(58) Field of Classification Search
CPC ... F01P 2007/146; F01P 7/14; F16K 11/0876; F16K 11/0873; F16K 11/087; F16K 5/201; F16K 5/205; F16K 5/0689
See application file for complete search history.

(56) References Cited

U.S. PATENT DOCUMENTS

| | | | | |
|---|---|---|---|---|
| 2,841,429 A | * | 7/1958 | McCuistion | ......... F16J 15/3236 277/402 |
| 2,983,533 A | * | 5/1961 | Tisch | ....................... F16J 15/32 277/649 |
| 3,052,478 A | * | 9/1962 | Horvereid | ................ F16J 15/32 277/394 |

(Continued)

FOREIGN PATENT DOCUMENTS

| | | |
|---|---|---|
| JP | 2016-188693 | 11/2016 |
| JP | 2017-020424 | 1/2017 |

(Continued)

*Primary Examiner* — David Colon-Morales
(74) *Attorney, Agent, or Firm* — Nixon & Vanderhye P.C.

(57) ABSTRACT

A sleeve member of a movable unit has a first pressure receiving surface and a second pressure receiving surface. The first pressure receiving surface receives a first fluid pressure in an axial direction opposite to a biasing force of a spring, when a valve member closes a seat opening portion. The second pressure receiving surface receives a second fluid pressure in the same axial direction to a direction of the biasing force of the spring, when the valve member closes the seat opening portion. A first surface area and a second surface area are made to be equal to each other. Each of the first and the second surface areas is an area of a projected portion on a virtual plane perpendicular to the axial direction. Each of the projected portions is obtained when each of the first and the second pressure receiving surfaces is projected to the virtual plane.

9 Claims, 14 Drawing Sheets

(56) References Cited

U.S. PATENT DOCUMENTS

| | | | | |
|---|---|---|---|---|
| 3,266,769 | A * | 8/1966 | Shand | F16K 5/207 |
| | | | | 251/172 |
| 3,384,337 | A * | 5/1968 | Brown | F16K 5/201 |
| | | | | 251/172 |
| 3,533,597 | A * | 10/1970 | Bolling | F16K 5/201 |
| | | | | 251/174 |
| 3,731,904 | A * | 5/1973 | Valince | F16K 5/201 |
| | | | | 251/315.13 |
| 4,319,734 | A * | 3/1982 | Acar | F16K 5/201 |
| | | | | 251/174 |
| 4,572,239 | A * | 2/1986 | Koch | F16K 11/0876 |
| | | | | 137/625.47 |
| 6,688,333 | B2 | 2/2004 | McLane et al. | |
| 8,490,945 | B2 * | 7/2013 | Keeper | F16K 5/188 |
| | | | | 251/172 |
| 8,820,706 | B2 * | 9/2014 | Kawauchi | F16K 5/205 |
| | | | | 251/180 |
| 9,267,606 | B2 * | 2/2016 | Haland | F16K 5/201 |
| 9,695,734 | B2 * | 7/2017 | Carns | F16K 5/0605 |
| 10,066,751 | B2 * | 9/2018 | Seko | F16K 5/0689 |
| 10,352,460 | B2 * | 7/2019 | Jang | F16K 5/201 |
| 10,443,745 | B2 * | 10/2019 | Yutani | F16K 5/201 |
| 10,794,488 | B2 * | 10/2020 | Yagi | F16K 5/06 |
| 2015/0075658 | A1 | 3/2015 | Tsuchiya et al. | |
| 2015/0122359 | A1 | 5/2015 | Tsuchiya et al. | |
| 2015/0361865 | A1 * | 12/2015 | Lee | F02M 26/28 |
| | | | | 123/41.08 |
| 2017/0009894 | A1 | 1/2017 | Seko et al. | |
| 2017/0211460 | A1 * | 7/2017 | Suzuki | F01P 7/14 |
| 2017/0335750 | A1 | 11/2017 | Yumisashi et al. | |
| 2018/0066758 | A1 * | 3/2018 | Yumisashi | F16K 27/067 |
| 2018/0119836 | A1 | 5/2018 | Ozeki et al. | |
| 2018/0149073 | A1 | 5/2018 | Shen et al. | |
| 2018/0313462 | A1 * | 11/2018 | Yoshida | F16K 5/202 |
| 2018/0335153 | A1 | 11/2018 | Ozeki et al. | |
| 2018/0340618 | A1 | 11/2018 | Seko et al. | |
| 2018/0340620 | A1 * | 11/2018 | Wicher | F16J 15/104 |
| 2019/0085987 | A1 * | 3/2019 | Grosskopf | F16K 5/0689 |
| 2019/0186641 | A1 | 6/2019 | Seko et al. | |
| 2019/0211738 | A1 | 7/2019 | Yoshimura et al. | |
| 2019/0219179 | A1 * | 7/2019 | Sato | F16K 27/04 |
| 2020/0114725 | A1 * | 4/2020 | Kanzaki | F16K 11/165 |
| 2020/0292081 | A1 * | 9/2020 | Nakayama | F16J 15/32 |

FOREIGN PATENT DOCUMENTS

| | | |
|---|---|---|
| JP | 2017-067079 | 4/2017 |
| JP | 2018-123887 | 8/2018 |

* cited by examiner

VALVE DEVICE

CROSS REFERENCE TO RELATED APPLICATION

This application is based on Japanese Patent Application No. 2019-40766 filed on Mar. 6, 2019, the disclosure of which is incorporated herein by reference.

FIELD OF TECHNOLOGY

The present disclosure relates to a valve device for increasing or decreasing a flow amount of fluid.

BACKGROUND

A valve device of this kind is known in the art. The valve device of the prior art includes a ball valve member having a valve surface of a spherical convex shape (a ball-shaped surface), a valve seat member having a valve seat of a spherical concave shape (a valve seat surface), a spring and so on. The spring biases the valve seat member to the ball valve member. Since the valve seat surface is pushed to the valve surface, a gap between the valve seat surface and the valve surface is sealed.

According to the valve device of the above prior art, communication or block-off of the communication between an opening portion of the valve member and an opening portion of the valve seat member is controlled when the valve member is rotated.

SUMMARY OF THE DISCLOSURE

It is an object of the present disclosure to provide a valve device, according to which a surface pressure applied to a valve seat surface being pushed to a valve surface is maintained at a constant value, even when a seat opening portion of a valve seat member is closed and fluid pressure applied to the valve seat surface is changed.

BRIEF DESCRIPTION OF THE DRAWINGS

The above and other objects, features and advantages of the present disclosure will become more apparent from the following detailed description made with reference to the accompanying drawings. In the drawings:

FIG. 3 is a schematically enlarged cross-sectional view showing a portion III in FIG. 1, wherein FIG. 3 shows a sleeve member, a valve seat member, a spring and other parts related to those members;

FIG. 4 is a schematically enlarged cross-sectional view showing a portion IV in FIG. 3, wherein FIG. 4 shows a condition that pressure of cooling water is not applied to a sleeve sealing member in a downward direction of a sleeve axial direction;

FIG. 5 is another schematically enlarged cross-sectional view showing the portion IV in FIG. 3, wherein FIG. 5 shows a condition that the pressure of the cooling water is applied to the sleeve sealing member in the downward direction of the sleeve axial direction and the sleeve sealing member is downwardly pushed;

FIG. 7 is a schematically enlarged cross-sectional view corresponding to FIG. 3, wherein FIG. 7 shows leakage paths of the cooling water in the first embodiment for the purpose of explaining advantages of the valve device of the second embodiment;

FIG. 8 is a schematically enlarged cross-sectional view showing a condition that leakage of the cooling water occurs in one of the leakage paths of FIG. 7, wherein FIG. 8 shows such parts related to a valve seat member;

DETAILED DESCRIPTION OF THE EMBODIMENTS

Figure 1:
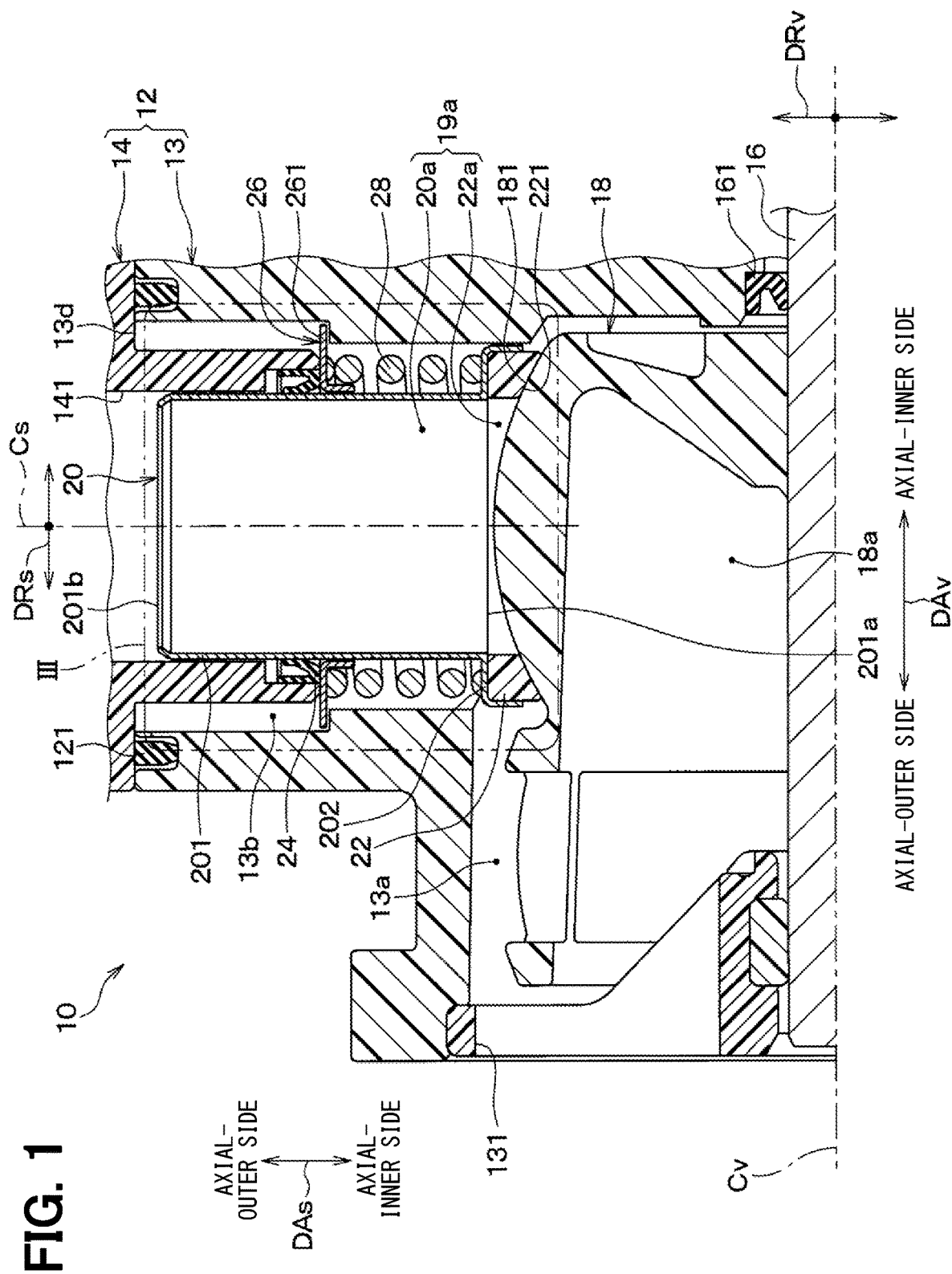
FIG. 1 is a schematic cross-sectional view showing a valve device according to a first embodiment in a vale closed condition.

The present disclosure will be explained hereinafter by way of multiple embodiments and/or modifications with reference to the drawings. The same reference numerals are given to the same or similar structures and/or portions in order to avoid repeated explanation.

First Embodiment

A valve device 10 of a first embodiment is a cooling-water control valve device, which is installed in an automotive vehicle. The valve device 10 shown in FIG. 1 is one of components of a cooling circuit, through which cooling water is circulated to an internal combustion engine, a radiator and so on. The valve device 10 controls (increases or decreases) a flow amount of the cooling water flowing through the cooling circuit. When the valve device 10 is closed, the flow of the cooling water is blocked. The cooling water is liquid-phase fluid, which includes LLC (Long Life Coolant), such as, ethylene glycol.

Figure 2:
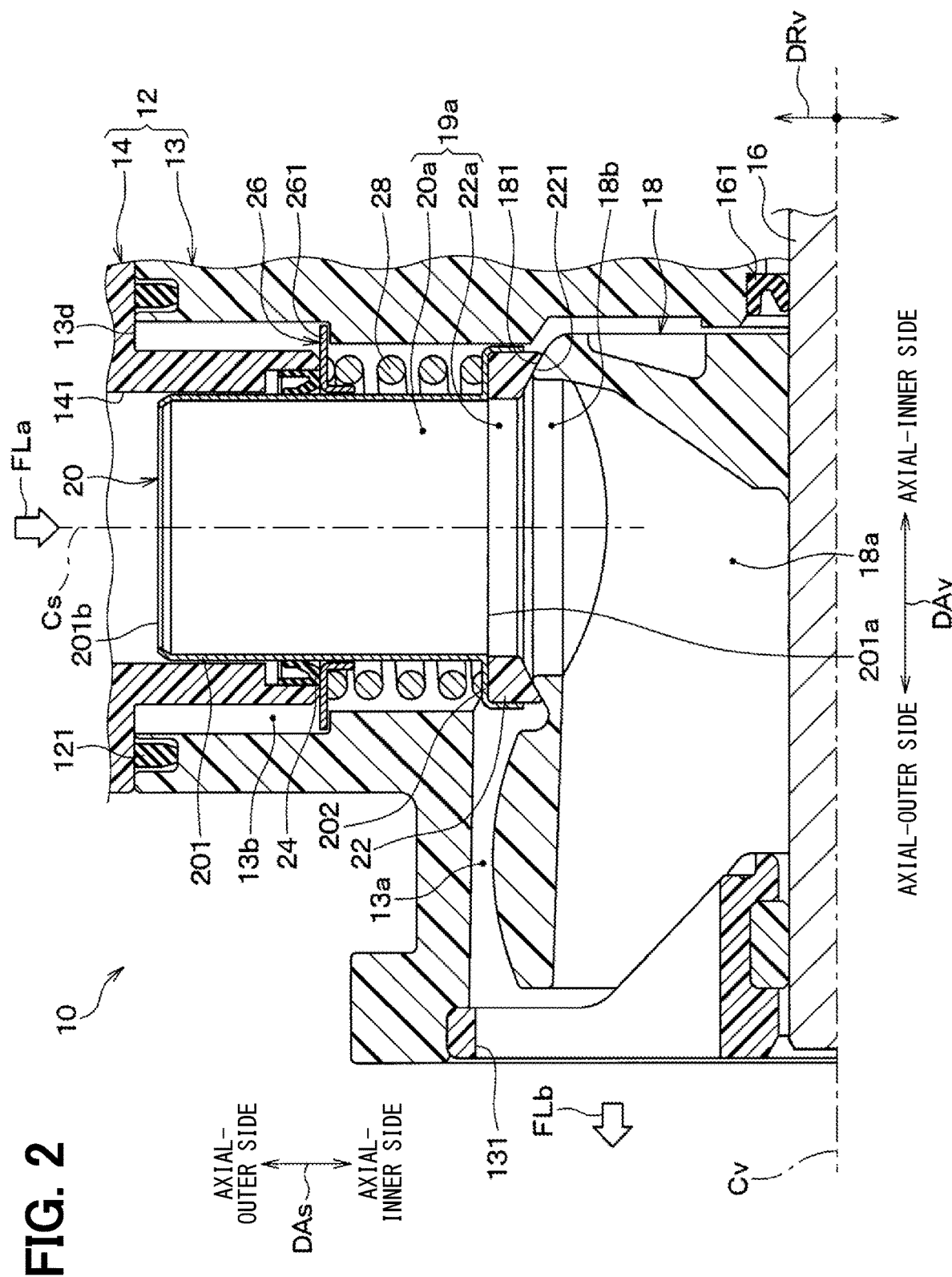
FIG. 2 is a schematic cross-sectional view showing the valve device of the first embodiment in a valve opened condition.

As shown in FIGS. 1 and 2, the valve device 10 is a ball-valve type device, according to which a valve member 18 is rotated around a valve center axis Cv to open or close the valve device 10. FIG. 1 shows a valve closed condition of the valve device 10. FIG. 2 shows a valve opened condition of the valve device 10. In FIG. 2, each of FLa and FLb indicates a flow direction of the cooling water passing through the valve device 10 in the valve opened condition. Each of FIG. 1 and FIG. 2 is a cross-sectional view showing the valve device 10, a part of which is cut away on a virtual plane including the valve center axis Cv and a sleeve center axis Cs. In each of FIG. 1 and FIG. 2, a part of the valve device 10 lower than the valve center axis Cv in the drawing is omitted.

The valve device 10 includes a valve housing 12, a valve shaft 16, the valve member 18, a sleeve member 20, a valve seat member 22, a sleeve sealing member 24, a seal holding member 26, a spring 28 and so on.

The valve housing 12 forms an outer envelope for the valve device 10 and it includes a housing body 13 and a spacer member 14. The housing body 13 has a valve accommodation space 13a for movably accommodating the valve member 18. The housing body 13 has a sleeve accommodation hole 13b, which extends in a direction perpendicular to the valve center axis Cv and movably accommodates the sleeve member 20. In the present disclosure, an axial direction of the sleeve member 20 is referred to a sleeve axial direction DAs, while an axial direction of the valve center axis Cv is also referred to as a valve axial direction DAv. A radial direction of the sleeve member 20 is referred to as a sleeve radial direction DRs, while a radial direction of the valve center axis Cv is referred to as a valve radial direction DRv. The sleeve radial direction DRs is also a radial direction of a cylindrical portion 201 of the sleeve member 20. The valve center axis Cv and the sleeve center axis Cs intersect with each other. The sleeve axial direction DAs is one of the valve radial directions DRv.

One of axial ends (an axial-inner end) of the sleeve accommodation hole 13b is connected to the valve accommodation space 13a, while the other of the axial ends (an axial-outer end) 13d of the sleeve accommodation hole 13b is opened to an outside of the housing body 13. One of axial ends of the valve accommodation space 13a (an axial-outer end in the valve axial direction DAv) is communicated to a flow-out port 131, through which the cooling water is discharged from an inside of the valve housing 12 to an outside of the valve housing 12.

The spacer member 14 is formed in a cylindrical shape and inserted into the sleeve accommodation hole 13b from the axial-outer end 13d thereof. The spacer member 14 is fixed to the housing body 13, for example, by screws or the like. A flow-in port 141 is formed in the spacer member 14, through which the cooling water flows from the outside of the valve housing 12 into the inside of the valve housing 12. A housing sealing member 121 of an annular shape is provided between the housing body 13 and the spacer member 14 in such a manner that the housing sealing member 121 surrounds an outer periphery of the axial-outer end 13d of the sleeve accommodation hole 13b.

The valve shaft 16 extends along the valve center axis Cv through the valve accommodation space 13a in the valve axial direction DAv. The valve shaft 16 is movably supported by the housing body 13 so that it is rotatable around the valve center axis Cv. A radial gap is formed between the housing body 13 and the valve shaft 16 on an axial-inner side of the valve accommodation space 13a (that is, on a right-hand side in the drawing). A shaft sealing member 161 of an annular shape is provided in the radial gap to seal the same.

The valve shaft 16 is connected to an electric motor (not shown), which is provided at a position on an axial-inner side of the shaft sealing member 161 in the valve axial direction DAv. The valve shaft 16 is rotated by the electric motor.

The valve member 18 is a valve body for opening or closing a fluid passage for the cooling water, which extends from the flow-in port 141 to the flow-out port 131. The valve member 18 is provided in the valve housing 12, more exactly, it is accommodated in the valve accommodation space 13a.

The valve member 18 is fixed to the valve shaft 16. Therefore, the valve member 18 is rotatable around the valve center axis Cv together with the valve shaft 16, when the valve shaft 16 is rotated by the electric motor.

A valve inside space 18a is formed in the valve member 18. The valve inside space 18a is opened on an axial-outer side of the valve member 18 in the valve axial direction DAv (on a side closer to the flow-out port 131, that is, on a left-hand side in the drawing). The valve inside space 18a is closed on an axial-inner side of the valve member 18 in the valve axial direction DAv (on the opposite side away from the flow-out port 131). Since the valve member 18 is accommodated in the valve accommodation space 13a, the valve inside space 18a is also located in the valve accommodation space 13a.

The valve member 18 has a valve surface 181 on its outer peripheral surface facing in an outward direction of the valve radial direction DRv. The valve surface 181 is composed of a convex spherical surface, which is expanded in the outward direction of the valve radial direction DRv. The valve member 18 has a valve opening portion 18b (FIG. 2), which penetrates a side wall of the valve member 18 in the valve radial direction DRv from the valve surface 181 to the valve inside space 18a.

Figure 3:
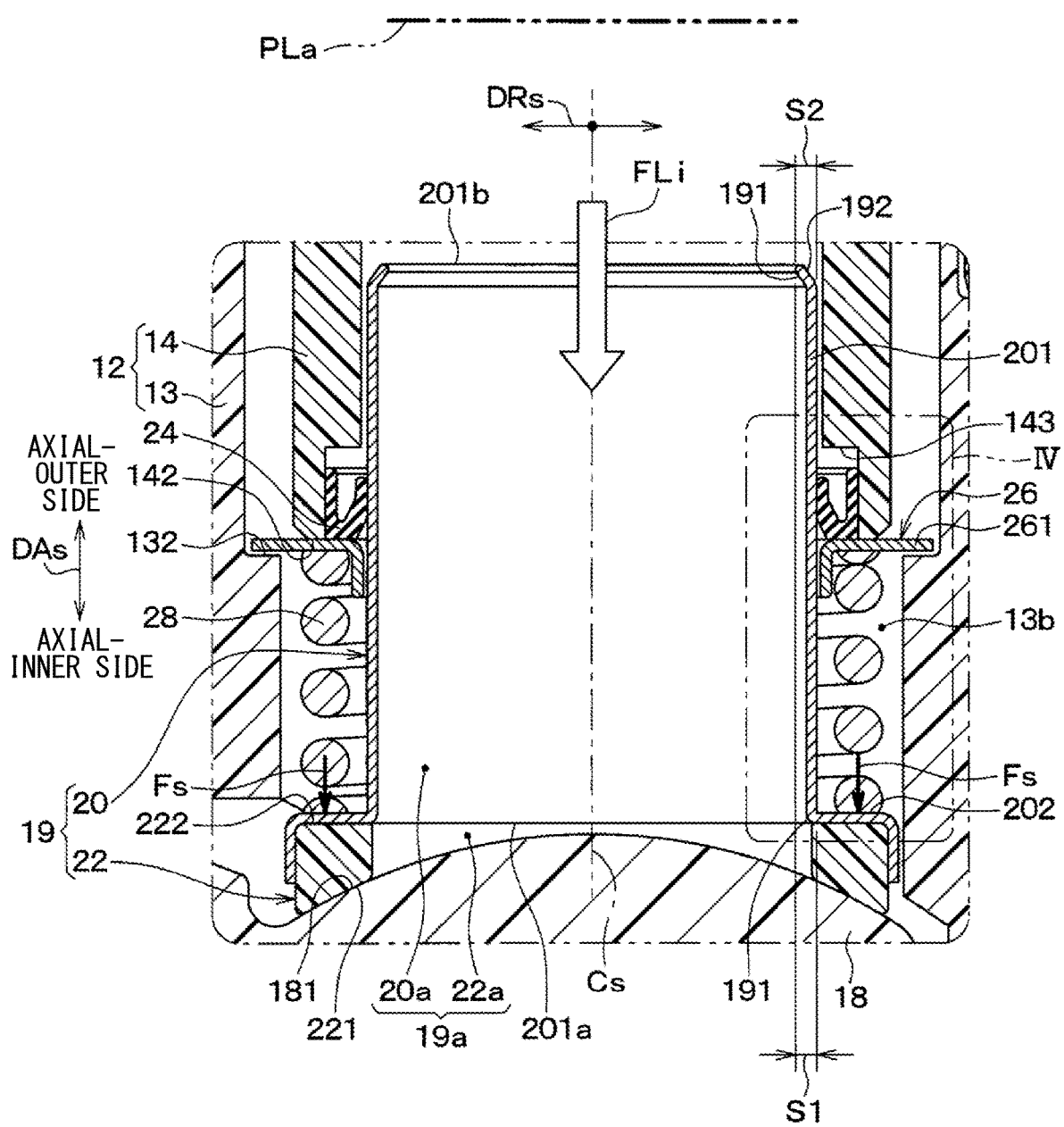

As shown in FIGS. 1 to 3, the sleeve member 20 has the cylindrical portion 201 having a cylindrical shape and extending in the sleeve axial direction DAs. The sleeve member 20 further has a seat holding portion 202 for holding the valve seat member 22. The sleeve member 20 is movable relative to the valve housing 12 in the sleeve axial direction DAs.

The cylindrical portion 201 of the sleeve member 20 has the sleeve center axis Cs, which extends in the sleeve axial direction DAs. The cylindrical portion 201 has a cylindrical inside end portion 201a on an axial-inner side of the sleeve axial direction DAs. The cylindrical portion 201 has a cylindrical outside end portion 201b on an axial-outer side of the sleeve axial direction DAs. A cylindrical hole portion 20a is formed in the sleeve member 20, more exactly, in the cylindrical portion 201 of the sleeve member 20. The cylindrical hole portion 20a extends in the sleeve axial direction DAs. The cylindrical outside end portion 201b is an end portion of the sleeve member 20 on its axial-outer side.

An axial end portion of the cylindrical portion 201 in the sleeve axial direction DAs, which includes the cylindrical outside end portion 201b, is inserted into an inside of the spacer member 14. Therefore, the spacer member 14 is an outer peripheral part, which is provided at a radial-outer side of the cylindrical portion 201 and which surrounds the cylindrical portion 201. The sleeve member 20 is located at an axial-inner side of the spacer member 14, that is, at an axial-inner side of the flow-in port 141 in the sleeve axial direction DAs.

The seat holding portion 202 of the sleeve member 20 is a radial-outwardly expanded portion, which extends from the cylindrical portion 201 in a radial-outward direction like a flange shape. In other words, the seat holding portion 202 is a flanged portion of the sleeve member 20. As above, the seat holding portion 202 is a part of the cylindrical portion 201, which is formed at the axial-inner side of the sleeve axial direction DAs and which is expanded in the outward direction of the sleeve radial direction DRs. Namely, the seat holding portion 202 extends from the cylindrical inside end portion 201a in the outward direction of the sleeve radial direction DRs in the shape of the flange. The seat holding portion 202 is in contact with the valve seat member 22 on an axial-outer side thereof in the sleeve axial direction DAs. An opposing surface 222 (FIG. 3) is formed on the axial-outer side of the valve seat member 22 in the sleeve axial direction DAs. The opposing surface 222 of the valve seat member 22 is opposed to the seat holding portion 202 of the sleeve member 20 in the sleeve axial direction DAs.

The seat holding portion 202 holds an outer peripheral portion of the valve seat member 22 in order to prevent the valve seat member 22 from being displaced relative to the sleeve member 20 in the valve axial direction DAv or in a circumferential direction of the valve member 18 around the valve center axis Cv, even when the valve member 18 is rotated.

The valve seat member 22 is formed in an annular shape having a center at the sleeve center axis Cs. The valve seat member 22 is made of resin, for example, PTFE (poly-tetra-fluoro-ethylene). A seat opening portion 22a is formed in the valve seat member 22. The seat opening portion 22a penetrates the valve seat member 22 in the sleeve axial direction DAs. A valve seat surface 221 is formed in the valve seat member 22 on an axial-inner side thereof in the sleeve axial direction DAs. The valve seat surface 221 is formed around the seat opening portion 22a. The valve seat surface 221 extends in a circumferential direction of the valve seat member 22 of the annular shape having the center at the sleeve center axis Cs.

The valve surface 181 of the valve member 18 is opposed to the valve seat surface 221 in the sleeve axial direction DAs and in contact with the valve seat surface 221. The valve seat surface 221 has a configuration corresponding to that of the valve surface 181. Namely, the valve seat surface 221 is formed in a concave spherical surface, which is recessed in an axial-outward direction of the sleeve axial direction DAs.

The valve seat surface 221 is pushed by the spring 28 to the valve surface 181, so that a valve gap between the valve seat surface 221 and the valve surface 181 is sealed. The valve surface 181 slides on the valve seat surface 221 when the valve member 18 is rotated.

The valve opening portion 18b of the valve member 18 is communicated to the seat opening portion 22a of the valve seat member 22 when the valve member 18 is rotated, so that the seat opening portion 22a is opened. The valve opened condition of the valve device 10 is shown in FIG. 2. In the valve opened condition, the cooling water flows into the valve inside space 18a, as indicated by the arrow FLa, through the flow-in port 141, the cylindrical hole portion 20a, the seat opening portion 22a and the valve opening portion 18b. The cooling water flows out from the valve inside space 18a to the outside of the valve housing 12, as indicated by the arrow FLb, through the flow-out port 131.

When the valve member 18 is further rotated, the valve opening portion 18b becomes out of communication with the seat opening portion 22a, so that the seat opening portion 22a is closed. The valve closed condition of the valve device 10 is shown in FIG. 1. As above, the valve member 18 opens or closes the seat opening portion 22a in accordance with the rotation thereof.

As shown in FIGS. 1 to 3, the sleeve sealing member 24 is a sealing part of the annular shape. The sleeve sealing member 24 is provided at an outside of the cylindrical portion 201 of the sleeve member 20 in the sleeve radial direction DRs.

The sleeve sealing member 24 is provided between the cylindrical portion 201 and the spacer member 14 in the sleeve radial direction DRs, so that the sleeve sealing member 24 is compressed and elastically deformed in the sleeve radial direction DRs by and between the cylindrical portion 201 and the spacer member 14. As a result that the sleeve sealing member 24 is compressed between them, it seals a radial gap between the cylindrical portion 201 and the spacer member 14 in the sleeve radial direction DRs.

More exactly, a part of the cooling water flows from the flow-in port 141 into an upstream-side radial space formed between the cylindrical portion 201 and the spacer member 14 in the sleeve radial direction DRs on the axial-outer side of the sleeve sealing member 24 in the sleeve axial direction DAs. The sleeve sealing member 24 prevents the cooling water from flowing over the sleeve sealing member 24 and flowing into a downstream-side radial space on the axial-inner side of the sleeve sealing member 24 in the sleeve axial direction DAs.

In the present embodiment, a V-ring is used as the sleeve sealing member 24. A closed side of the V-ring 24 (a lower side thereof) in a cross section thereof is located at a position of the axial-inner side thereof in the sleeve axial direction DAs.

The spacer member 14 has a structure for holding the sleeve sealing member 24. More exactly, the spacer member 14 has an annular recessed portion at its axial-inner side for limiting a movement of the sleeve sealing member 24 in a direction to the axial-outer side of the spacer member 14 in the sleeve axial direction DAs.

The seal holding member 26 is provided at a position of the axial-inner side of the spacer member 14 in the sleeve axial direction DAs, so that the seal holding member 26 supports the axial-inner side of the sleeve sealing member 24 in the sleeve axial direction DAs. The seal holding member 26 is formed in an annular shape to surround an outer periphery of the cylindrical portion 201 of the sleeve member 20.

A sealing groove 143 of the annular recessed portion (FIG. 3) is formed between the spacer member 14 and the seal holding member 26, so that the sleeve sealing member 24 is axially inserted into the sealing groove 143. The seal holding member 26 forms a wall surface, which faces an axial-inner side of the sealing groove 143 in the sleeve axial direction DAs.

The seal holding member 26 is made of, for example, a metal plate material. The seal holding member 26 has a disc shape portion 261 having a thickness in the sleeve axial direction DAs. A through-hole is formed at a center of the disc shape portion 261, so that the cylindrical portion 201 of the sleeve member 20 is inserted into the through-hole.

The housing body 13 has a plate supporting portion 132, which is formed in the housing body 13 at a position on an axial-inner side of the disc shape portion 261 in the sleeve axial direction DAs. The disc shape portion 261 is held at a position between a forward end 142 (a lower-side end) of the spacer member 14 and the plate supporting portion 132 of the housing body 13 in the sleeve axial direction DAs.

The plate supporting portion 132 of the housing body 13 is located at an outside of the seat holding portion 202 of the sleeve member 20 and the valve seat member 22 in the sleeve radial direction DRs. In addition, the plate supporting portion 132 is located at a position away from the seat holding portion 202 and the valve seat member 22 in a direction to the axial-outer side of the sleeve axial direction DAs. The disc shape portion 261 of the seal holding member 26 extends in the radial-outward direction of the sleeve radial direction DRs from an inside contacting position between the disc shape portion 261 and the axial-inner side of the sleeve sealing member 24 in the sleeve axial direction DAs to an outside contacting position between the disc shape portion 261 and the axial-outer side of the plate supporting portion 132 in the sleeve axial direction DAs.

According to the above structure, the seal holding member 26 is held in the sleeve axial direction DAs between the forward end 142 of the spacer member 14 and the plate supporting portion 132 of the housing body 13. When the seal holding member 26 is brought into contact with the plate supporting portion 132, the plate supporting portion 132 stops the movement of the sleeve sealing member 24 and the seal holding member 26 in the direction to the axial-inner side of the sleeve axial direction DAs.

Figure 4:
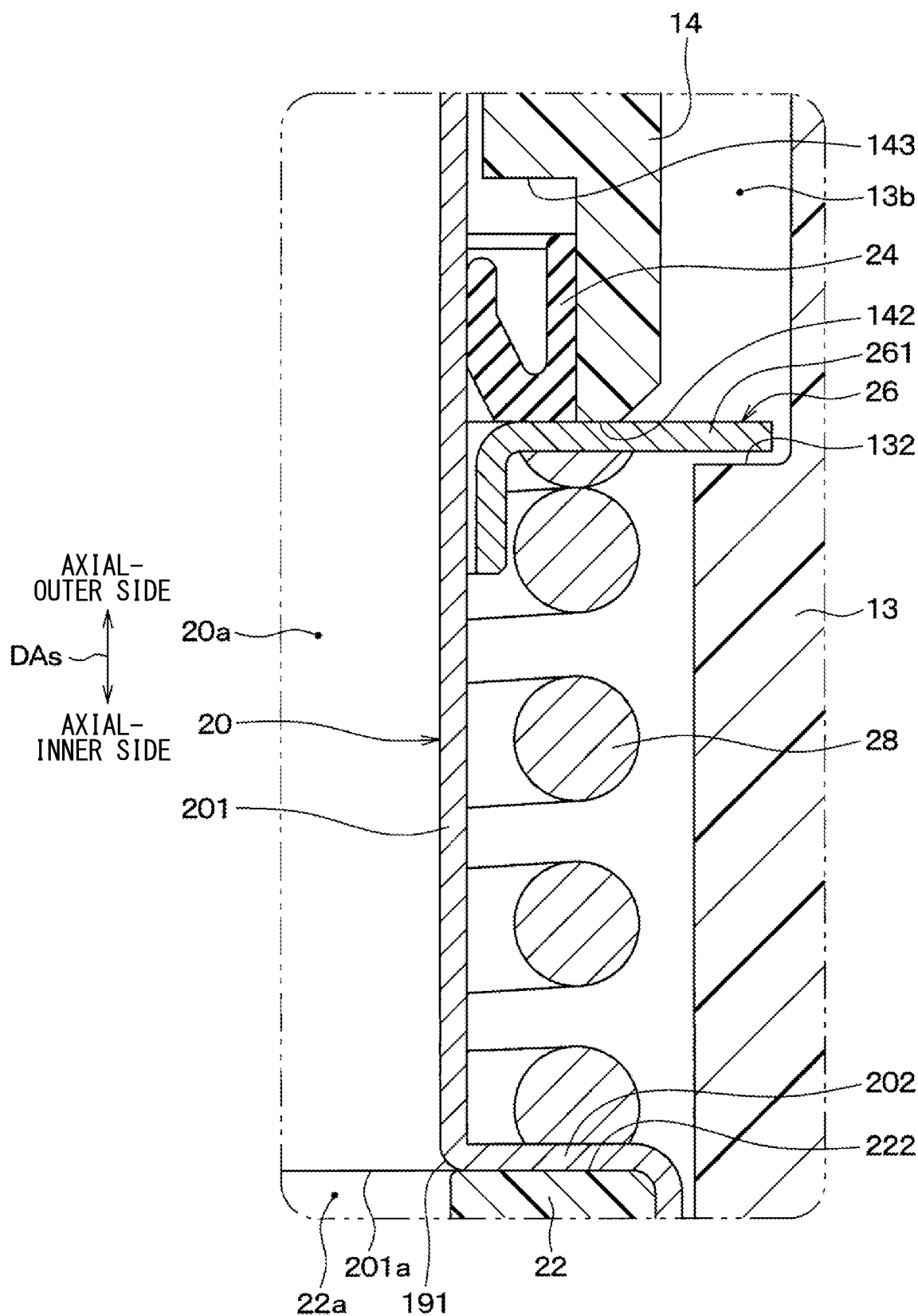
Figure 5:
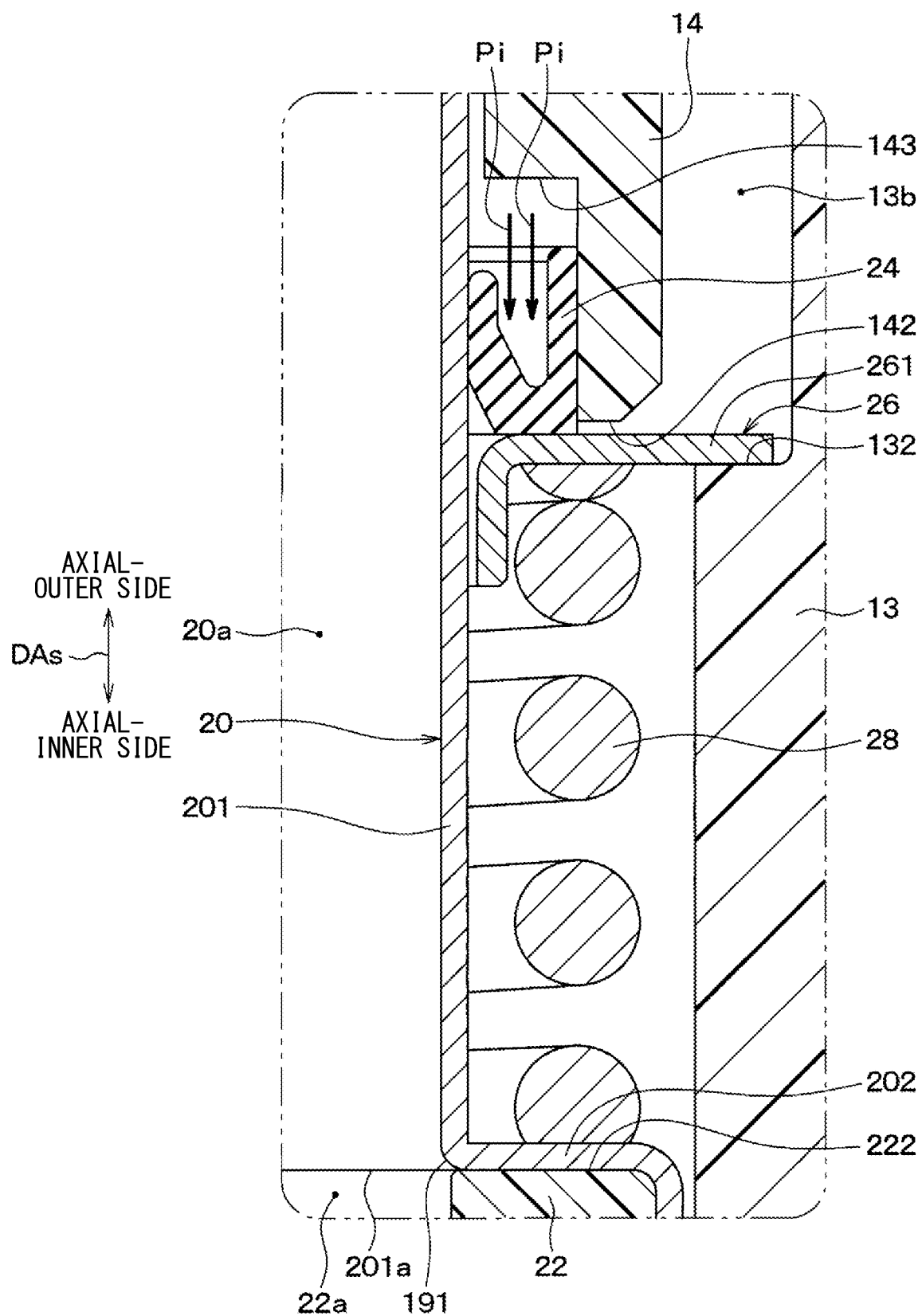

As shown in FIG. 4, when the disc shape portion 261 of the seal holding member 26 is in contact with the forward end 142 of the spacer member 14, a lower-side axial gap is formed between the disc shape portion 261 and the plate supporting portion 132 in the sleeve axial direction DAs. In addition, as shown in FIG. 5, when the disc shape portion 261 of the seal holding member 26 is brought into contact with the plate supporting portion 132, an upper-side axial gap is formed between the disc shape portion 261 and the forward end 142 of the spacer member 14 in the sleeve axial direction DAs. Those axial gaps are not always necessary to be formed. However, those axial gaps are optionally formed in view of a manufacturing process of the valve device 10.

In the valve closed condition of the valve device 10, the flow of the cooling water indicated by the arrow FLi in FIG. 3 is blocked off by the valve member 18. In the valve closed condition of FIG. 1 and FIG. 3, fluid pressure of the cooling water in the flow-in port 141 becomes larger than that in the flow-out port 131. As a result, the cooling water, the flow of which is blocked off by the valve member 18, generates a pushing force Pi for pushing the sleeve sealing member 24 and the seal holding member 26 in the direction to the axial-inner side of the sleeve axial direction DAs, as shown in FIG. 5. When the pushing force Pi becomes larger than a biasing force of the spring 28, the disc shape portion 261 of the seal holding member 26 is brought into contact with the plate supporting portion 132.

On the other hand, when the pushing force Pi of the cooling water is not applied to the sleeve sealing member 24, the disc shape portion 261 of the seal holding member 26 is brought into contact with the forward end 142 of the spacer member 14 by the biasing force of the spring 28, as shown in FIG. 4.

As shown in FIGS. 1 to 3, the spring 28 is a biasing member for generating the biasing force Fs, which is applied to the sleeve member 20 in the direction to the axial-inner side of the sleeve axial direction DAs. The valve seat member 22 is also biased by the biasing force Fs in the direction to the axial-inner side of the sleeve axial direction DAs. Therefore, the sleeve member 20 and the valve seat member 22 form a movable unit 19, which is biased by the spring 28 in the direction to the axial-inner side of the sleeve axial direction DAs.

The spring 28 is located at a position on the axial-inner side of the seal holding member 26 in the sleeve axial direction DAs. The spring 28 is composed of a compressed coil spring, which is arranged at the outside of the cylindrical portion 201 of the sleeve member 20 in the sleeve radial direction DRs.

The seal holding member 26 also works as a spring seat portion for the spring 28. The spring 28 is held in a compressed condition between the disc shape portion 261 of the seal holding member 26 and the seat holding portion 202 of the sleeve member 20 in the sleeve axial direction DAs. According to the above structure, the spring 28 generates the biasing force Fs for pushing the valve seat surface 221 to the valve surface 181. In other words, the valve seat member 22 is compressed by the biasing force Fs of the spring 28 between the seat holding portion 202 of the sleeve member 20 and the valve surface 181.

The movable unit 19 is composed of the sleeve member 20 and the valve seat member 22. The movable unit 19 is movably supported in the valve housing 12 in the sleeve axial direction DAs. A fluid flow passage 19a is formed in the movable unit 19, wherein the fluid flow passage 19a includes the cylindrical hole portion 20a and the seat opening portion 22a. The fluid flow passage 19a extends in the inside of the movable unit 19 in the sleeve axial direction DAs. The cooling water flows into the fluid flow passage 19a from the flow-in port 141. The fluid flow passage 19a extends in the inside of the cylindrical portion 201 and in the inside of the valve seat member 22. The seat opening portion 22a corresponds to one end of the fluid flow passage 19a on the axial-inner side of the sleeve axial direction DAs.

As indicated by the arrow FLa in FIG. 2, the cooling water flows through the fluid flow passage 19a from the axial-outer side to the axial-inner side of the sleeve axial direction DAs, when the valve member 18 opens the seat opening portion 22a. The condition that the valve member 18 opens the seat opening portion 22a is equal to the valve opened condition of the valve device 10. On the other hand, the condition that the valve member 18 closes the seat opening portion 22a corresponds to the valve closed condition of the valve device 10. In the present embodiment, the cooling water does not flow through the fluid flow passage 19a in the axial-upward direction opposite to the flow direction of FLa.

As shown in FIG. 3, the movable unit 19 includes a first pressure receiving surface 191 and a second pressure receiving surface 192. Each of the first and the second pressure receiving surfaces 191 and 192 is a part of a surface of the movable unit 19, which is in contact with the cooling water. More exactly, each of the first and the second pressure receiving surfaces 191 and 192 is formed in the sleeve member 20, which is one of the parts of the movable unit 19.

The first pressure receiving surface 191 is a surface portion, which receives a first fluid pressure from the cooling water, when the valve member 18 closes the seat opening portion 22a. The above first fluid pressure is a biasing-force opposing force, which is generated in the axial-upward direction opposite to the biasing force Fs of the spring 28 in the sleeve axial direction DAs. On the other hand, the second pressure receiving surface 192 is another surface portion, which receives a second fluid pressure from the cooling water, when the valve member 18 closes the seat opening portion 22a. The above second fluid pressure is a biasing-force increasing force, which is generated in the axial-downward direction the same to the biasing force Fs of the spring 28 in the sleeve axial direction DAs.

The movable unit 19 is formed in such a manner that a first surface area S1 becomes equal to a second surface area S2. The first surface area S1 is an area of a projected portion of the first pressure receiving surface 191, which is projected to a virtual plane PLa perpendicular to the sleeve axial direction DAs. The second surface area S2 is likewise an area of a projected portion of the second pressure receiving surface 192, which is projected to the virtual plane PLa perpendicular to the sleeve axial direction DAS. Each of the projected portions on the virtual plane PLa for the first and the second pressure receiving surfaces 191 and 192 has an annular shape having a center at the sleeve center axis Cs. The first surface area S1 and the second surface area S2 is made to be equal to each other in order that the fluid pressure to be applied to the first pressure receiving surface 191 and the fluid pressure to be applied to the second pressure receiving surface 192 are offset by each other. It is, however, not always necessary to make the first surface area S1 and the second surface area S2 equal to each other.

As shown in FIG. 3, when the seat opening portion 22a of the valve seat member 22 is closed, the fluid pressure is applied to the valve surface 181 on the axial-inner side of the movable unit 19 in the sleeve axial direction DAs. The fluid pressure applied to the movable unit 19 in the direction to the axial-inner side of the sleeve axial direction DAs is offset by the fluid pressure applied to the movable unit 19 in the direction to the axial-outer side of the sleeve axial direction DAs. The fluid pressure applied to the movable unit 19 in the direction to the axial-outer side of the sleeve axial direction DAs corresponds to the biasing-force opposing force, while the fluid pressure applied to the movable unit 19 in the direction to the axial-inner side of the sleeve axial direction DAs corresponds to the biasing-force increasing force.

In the valve closed condition of the valve device 10, a surface pressure of the valve seat surface 221 to be applied to the valve surface 181 of the valve member 18 can be maintained at a constant value, even when the fluid pressure of the cooling water is changed.

In the present embodiment, as shown in FIGS. 3 and 5, the sleeve sealing member 24 is provided at the outside of the cylindrical portion 201 of the sleeve member 20 in the sleeve radial direction DRs to seal the radial gap between the cylindrical portion 201 and the spacer member 14. The seal holding member 26 supports the sleeve sealing member 24 on the axial-inner side in the sleeve axial direction DAs. The plate supporting portion 132 of the housing body 13 is in contact with the seal holding member 26 and limits the movement of the sleeve sealing member 24 in the direction to the axial-inner side of the sleeve axial direction DAs. As above, it is possible to avoid a situation that the sleeve sealing member 24 drops out from a predetermined position (the sealing groove 143) between the cylindrical portion 201 of the sleeve member 20 and the spacer member 14.

In the present embodiment, as shown in FIG. 3, the plate supporting portion 132 of the housing body 13 is located at the outside of the seat holding portion 202 of the sleeve member 20 and the valve seat member 22 in the sleeve radial direction DRs. The seal holding member 26 extends in the radial-outward direction of the sleeve radial direction DRs from the inside contacting position between the disc shape portion 261 and the axial-inner side of the sleeve sealing member 24 in the sleeve axial direction DAs to the outside contacting position between the disc shape portion 261 and the axial-outer side of the plate supporting portion 132 in the sleeve axial direction DAs. When assembling the valve device 10, the plate supporting portion 132 is not an obstacle for inserting the sleeve member 20 and the valve seat member 22 into the housing body 13. It is, therefore, an advantage that the valve device 10 can be easily assembled.

In addition, as shown in FIG. 3, the spring 28 is located at the position of the axial-inner side of the seal holding member 26 in the sleeve axial direction DAs. The spring 28 is held in the compressed condition between the seal holding member 26 and the seat holding portion 202 of the sleeve member 20 in the sleeve axial direction DAs. When the seal holding member 26 is moved together with the sleeve sealing member 24 in the sleeve axial direction DAs, the biasing force Fs of the spring 28 is correspondingly changed. However, in the present embodiment, the plate supporting portion 132 restricts the movement of the sleeve sealing member 24 in the direction to the axial-inner side of the sleeve axial direction DAs. A change of compression amount of the spring 28, which is caused by the movement of the seal holding member 26, can be suppressed by the plate supporting 132 to a small amount. In other words, the change of the biasing force Fs of the spring 28, which is caused by the movement of the seal holding member 26, can be suppressed to the small amount.

Second Embodiment

A second embodiment will be explained with reference to the drawings by focusing on differences between the first embodiment and the second embodiment.

Figure 6:
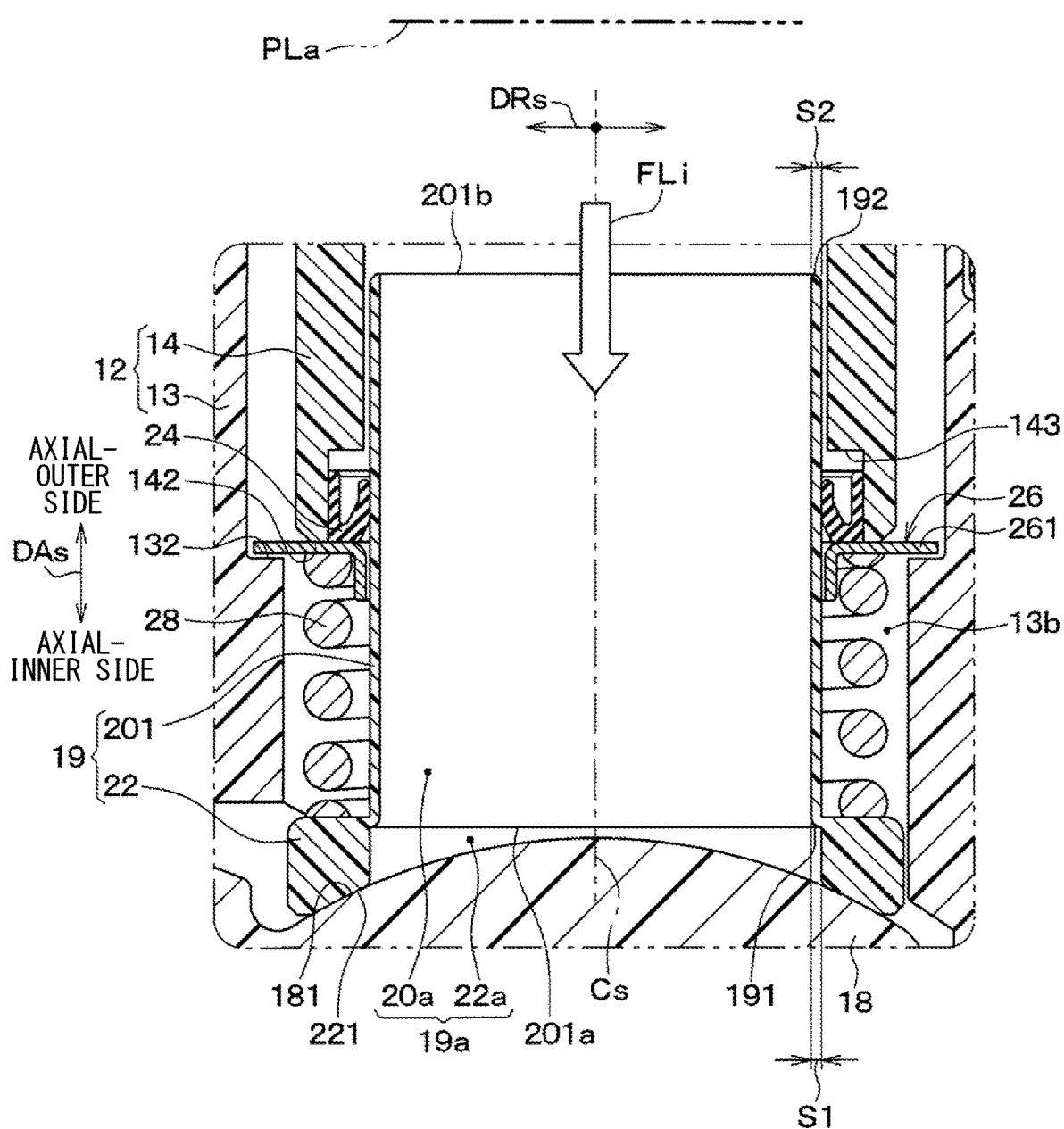
FIG. 6 is a schematically enlarged cross-sectional view showing a portion of a second embodiment, which corresponds to the portion III in FIG. 1 in a similar manner to FIG. 3.

As shown in FIG. 6, in the present embodiment, the cylindrical portion 201 of the sleeve member 20 and the valve seat member 22, namely the movable unit 19 is integrally formed as one piece. In a similar manner to the first embodiment, the movable unit 19 is formed in such a way that the first surface area S1 of the projected portion of the first pressure receiving surface 191 is equal to the second surface area S2 of the projected portion of the second pressure receiving surface 192.

More exactly, the valve seat member 22 is directly connected to the cylindrical portion 201 of the sleeve member 20. The movable unit 19 of the second embodiment is made of the resin, which is the same material for the valve seat member 22 of the first embodiment.

Since the cylindrical portion 201 and the valve seat member 22 are integrally formed with each other as one piece, a structure corresponding to the seat holding portion 202 of the first embodiment is not provided in the second embodiment. The valve seat member 22 has a radially expanded portion, which extends from the cylindrical portion 201 in the radial-outward direction of the sleeve radial direction DRs.

An operation of the valve device 10 of the first embodiment will be explained with reference to FIGS. 7 and 8 for the purpose of explaining advantages of the valve device 10 of the second embodiment through comparisons between them.

Figure 7:
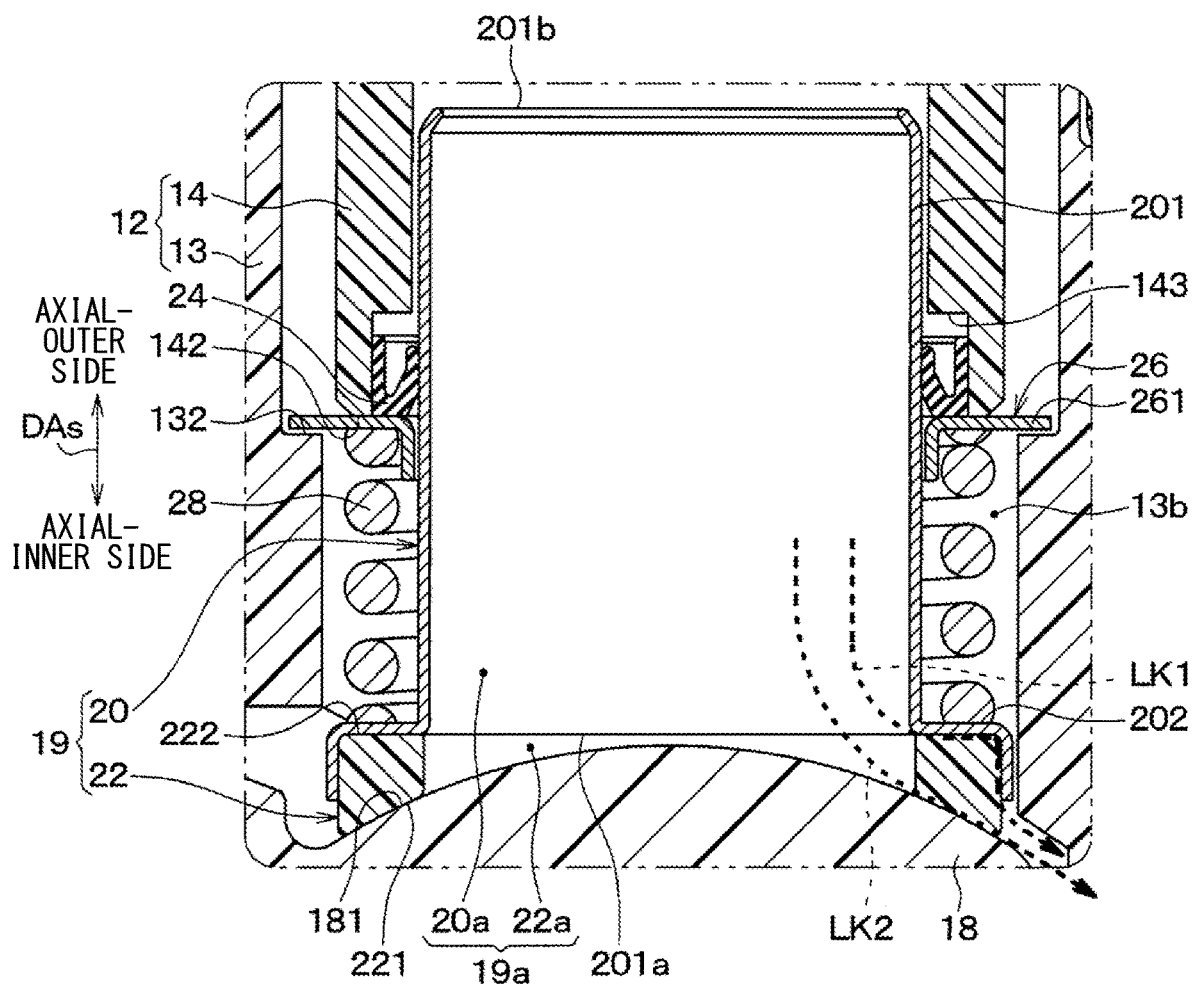
Figure 8:
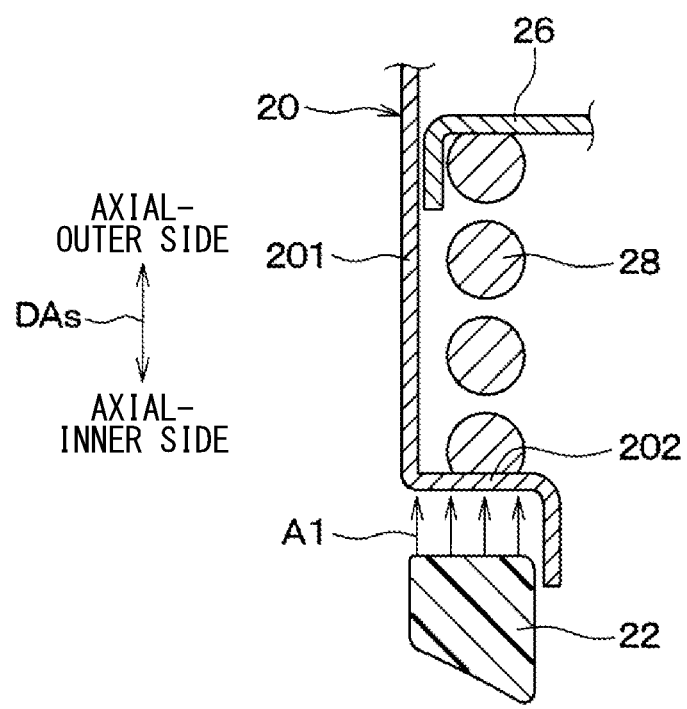

As shown in FIGS. 7 and 8, a first leakage path LK1 and a second leakage path LK2 can be considered as a path for the cooling water, which would leak from the fluid flow passage 19a to the outside thereof in the valve closed condition of the valve device 10. In the first leakage path LK1, the cooling water passes through a first gap between the valve seat member 22 and the seat holding portion 202 of the sleeve member 20. In the second leakage path LK2, the cooling water passes through a second gap between the valve seat surface 221 of the valve seat member 22 and the valve surface 181 of the valve member 18.

In a case that the leakage of the cooling water occurs in the first leakage path LK1, a fluid pushing force is generated by the fluid pressure entering the first gap between the valve seat member 22 and the seat holding portion 202 of the sleeve member 20. The fluid pushing force pushes the sleeve member 20 in the axial-upward direction to the axial-outer side of the sleeve axial direction DAs, as shown in FIG. 8. As a result, the sleeve member 20 may be lifted up from the valve seat member 22, as indicated by an arrow A1.

More exactly, the fluid pressure of the cooling water applied to the sleeve member 20 generates not only the fluid pushing force for pushing the sleeve member 20 in the axial-upward direction to the axial-outer side but also a fluid pushing force for pushing the sleeve member 20 in the axial-downward direction to the axial-inner side of the sleeve axial direction DAs. However, when the cooling water flows along the first leakage path LK1 from the fluid flow passage 19a into the first gap between the valve seat member 22 and the seat holding portion 202 of the sleeve member 20, the fluid pushing force in the axial-upward direction to the axial-outer side becomes larger than the fluid pushing force in the axial-downward direction to the axial-inner side. As a result, the sleeve member 20 may be lifted up from the valve seat member 22.

On the other hand, according to the second embodiment, the cylindrical portion 201 and the valve seat member 22 are integrally formed as one piece, as shown in FIG. 6. Therefore, the leakage of the cooling water does not occur in a path corresponding to the first leakage path LK1 of the first embodiment (FIG. 7). It is, therefore, possible to avoid the situation that the sleeve member 20 is lifted up from the valve seat member 22.

The structure and operation of the second embodiment other than the above explained are the same to those of the first embodiment. The same advantages to those of the first embodiment can be also obtained in the second embodiment.

Third Embodiment

A third embodiment will be explained with reference to the drawing by focusing on differences between the first embodiment and the third embodiment.

Figure 9:
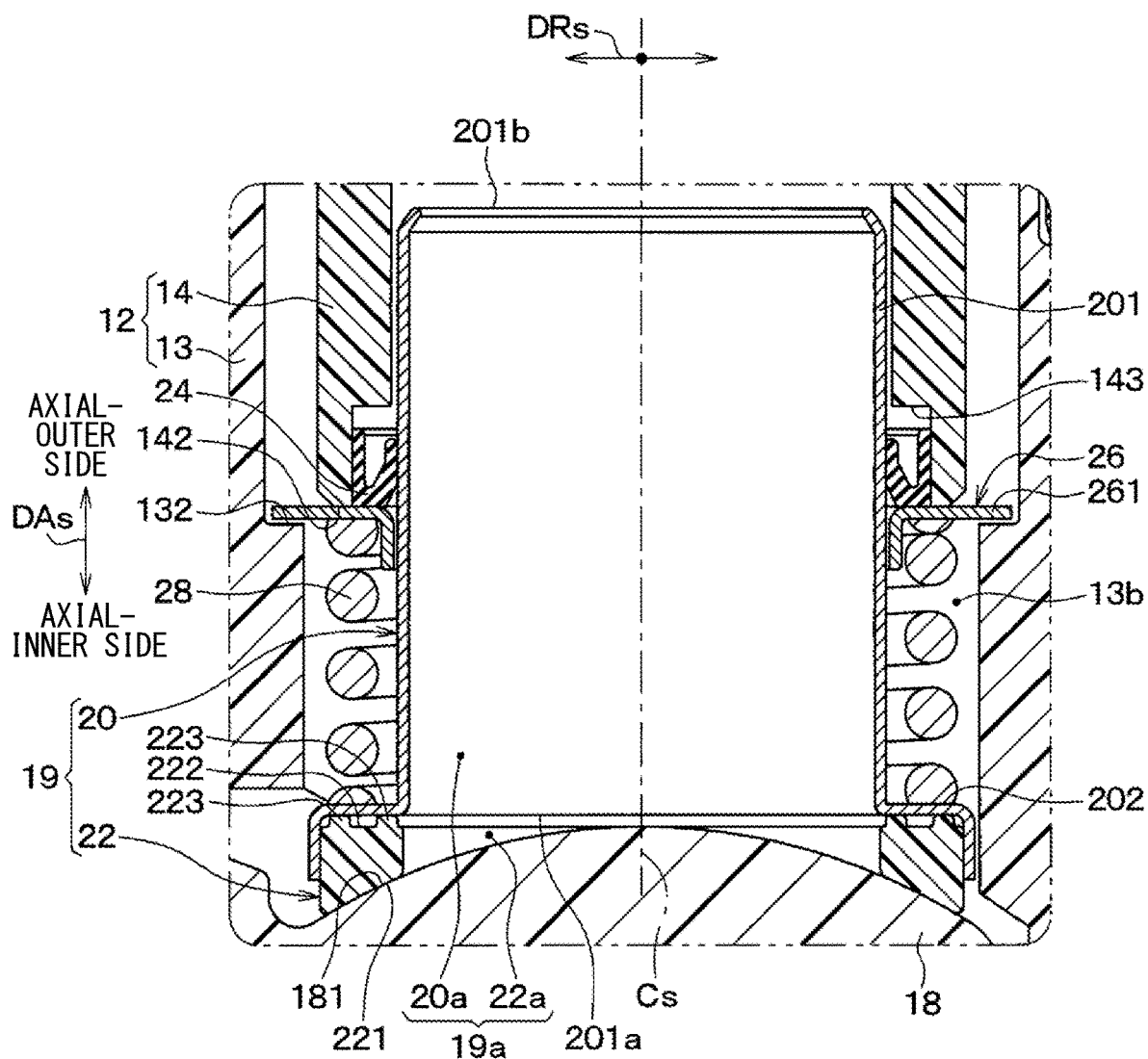
FIG. 9 is a schematically enlarged cross-sectional view showing a portion of a third embodiment, which corresponds to the portion III of FIG. 1.

As shown in FIG. 9, in the present embodiment, the valve seat member 22 has an annular pushing portion 223 formed in the opposing surface 222.

The annular pushing portion 223 of the valve seat member 22 is composed of two projecting portions, each of which is projecting from the opposing surface 222 in the axial-upward direction to the axial-outer side of the sleeve axial direction DAs. Each of the projecting portions 223 extends in the circumferential direction of the valve seat member 22 of the annular shape, namely in the circumferential direction around the sleeve center axis Cs. Alternatively, the annular pushing portion 223 may be composed of one or three (or more than three) projecting portions.

Since the valve seat member 22 is pushed by the biasing force of the spring 28 through the seat holding portion 202 of the sleeve member 20, the annular pushing portion 223 of the valve seat member 22 is a part of the opposing surface 222, which is locally and strongly pushed by the seat holding portion 202.

According to the above structure, a surface pressure at the annular pushing portion 223 is locally larger than that at the other part of the opposing surface 222. As a result, it is possible to surely prevent the leakage of the cooling water in the first leakage path LK1 (shown in FIG. 7).

The structure and operation of the third embodiment other than the above explained are the same to those of the first embodiment. The same advantages to those of the first embodiment can be likewise obtained in the third embodiment.

Fourth Embodiment

A fourth embodiment will be explained with reference to the drawing by focusing on differences between the first embodiment and the fourth embodiment.

Figure 10:
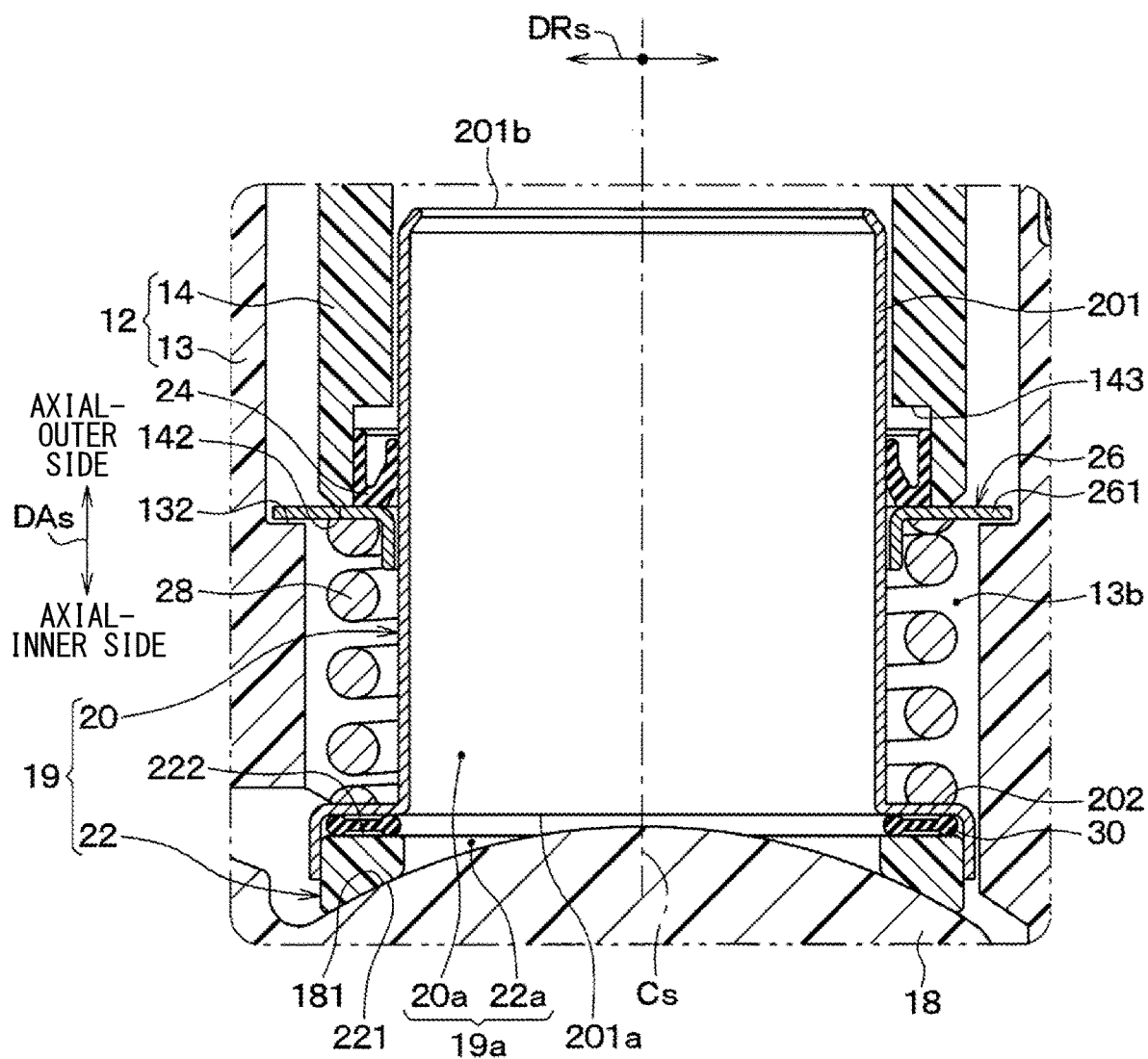
FIG. 10 is a schematically enlarged cross-sectional view showing a portion of a fourth embodiment, which corresponds to the portion III of FIG. 1.

As shown in FIG. 10, the valve device 10 of the present embodiment has a seat spacer member 30 made of elastic material, such as, rubber.

More exactly, the seat spacer member 30 is formed in an annular shape along the annular shape of the valve seat member 22. The seat spacer member 30 extends in the circumferential direction around the sleeve center axis Cs.

The seat spacer member 30 has a higher elasticity than that of the seat holding portion 202 of the sleeve member 20 or the valve seat member 22. In other words, the seat spacer member 30 is more easily and elastically deformed than the seat holding portion 202 or the valve seat member 22.

The seat spacer member 30 is interposed between the seat holding portion 202 and the valve seat member 22 and in contact with each of them. In addition, the seat spacer member 30 is elastically deformed in the sleeve axial direction DAs by and between the seat holding portion 202 and the valve seat member 22, wherein the biasing force Fs of the spring 28 is applied to the seat holding portion 202. The seat spacer member 30 also works as a sealing member for sealing the first gap between the seat holding portion 202 and the valve seat member 22.

Since the seat spacer member 30 is interposed between the seat holding portion 202 and the valve seat member 22, it is possible to prevent the leakage of the cooling water in the first leakage path LK1 (shown in FIG. 7).

The structure and operation of the fourth embodiment other than the above explained are the same to those of the first embodiment. The same advantages to those of the first embodiment can be also obtained in the fourth embodiment.

Fifth Embodiment

A fifth embodiment will be explained with reference to the drawing by focusing on differences between the first embodiment and the fifth embodiment.

Figure 11:
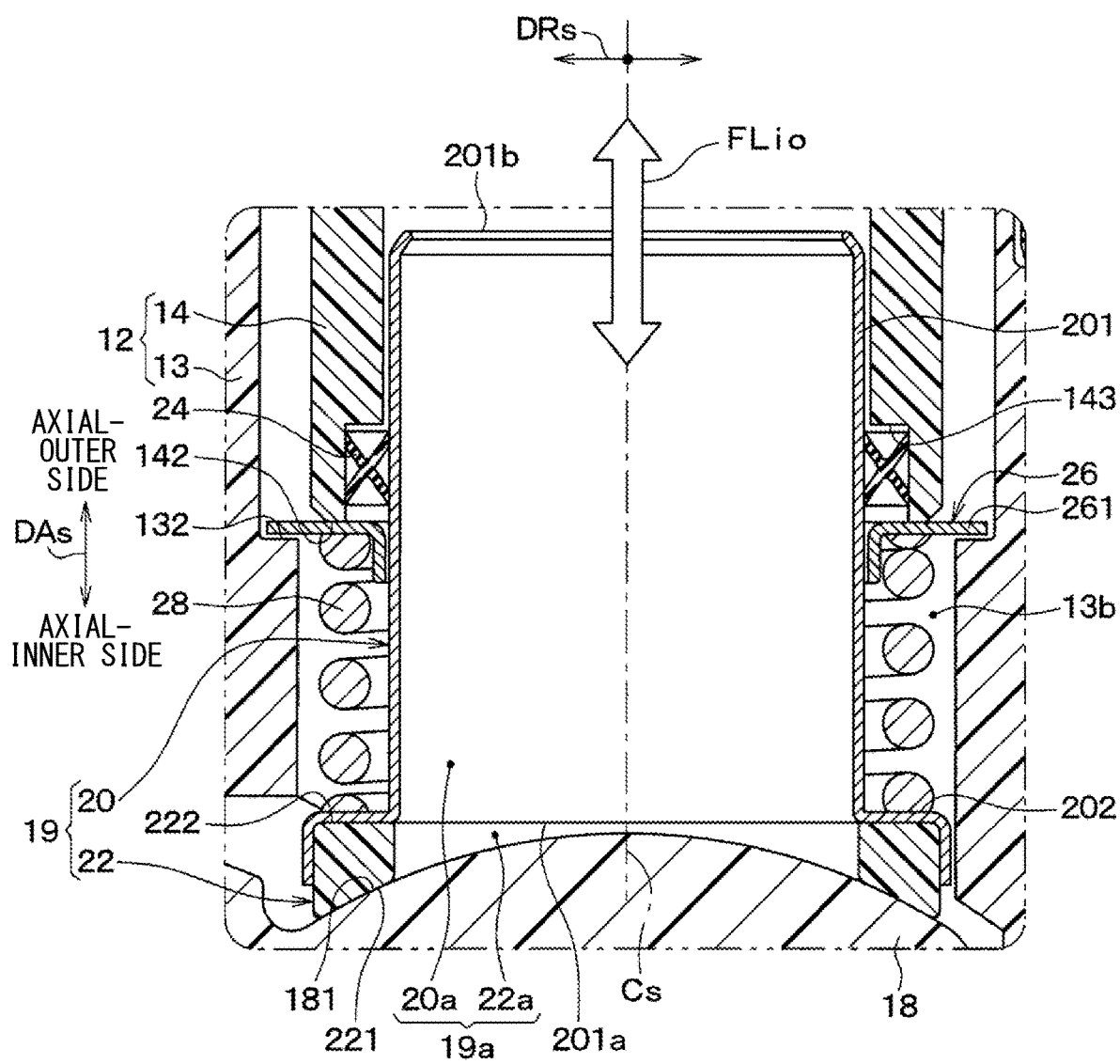
FIG. 11 is a schematically enlarged cross-sectional view showing a portion of a fifth embodiment, which corresponds to the portion III of FIG. 1.

As indicated by an arrow FLio in FIG. 11, the cooling water flows through the fluid flow passage 19a from the axial-outer side to the axial-inner side of the sleeve axial direction DAs, or vice versa, in the valve opened condition of the valve device 10. Since the cooling water flows in both directions in the present embodiment, the flow-in port 141 of the first embodiment is referred to as a first port in the present embodiment and the flow-out port 131 is referred to as a second port.

Since the cooling water flows in both directions, the sleeve sealing member 24 is composed of not the V-ring but an X-ring. The X-ring is a sealing member having a cross section of an X-letter shape.

Since the X-ring is used as the sleeve sealing member 24, the sleeve sealing member 24 has a sealing function for the flows of the cooling water in both directions, which is indicated by the arrow FLio. In other words, the radial gap between the cylindrical portion 201 of the sleeve member 20 and the spacer member 14 can be sealed, independently whether the fluid pressure of the cooling water in the first port 141 is higher than that in the second port 131 or not.

The structure and operation of the fifth embodiment other than the above explained are the same to those of the first embodiment. The same advantages to those of the first embodiment can be also obtained in the fifth embodiment.

Although the fifth embodiment is a modification of the first embodiment, the fifth embodiment can be combined to any one of the second to the fourth embodiments.

Sixth Embodiment

A sixth embodiment will be explained with reference to the drawing by focusing on differences between the fifth embodiment and the sixth embodiment.

Figure 12:
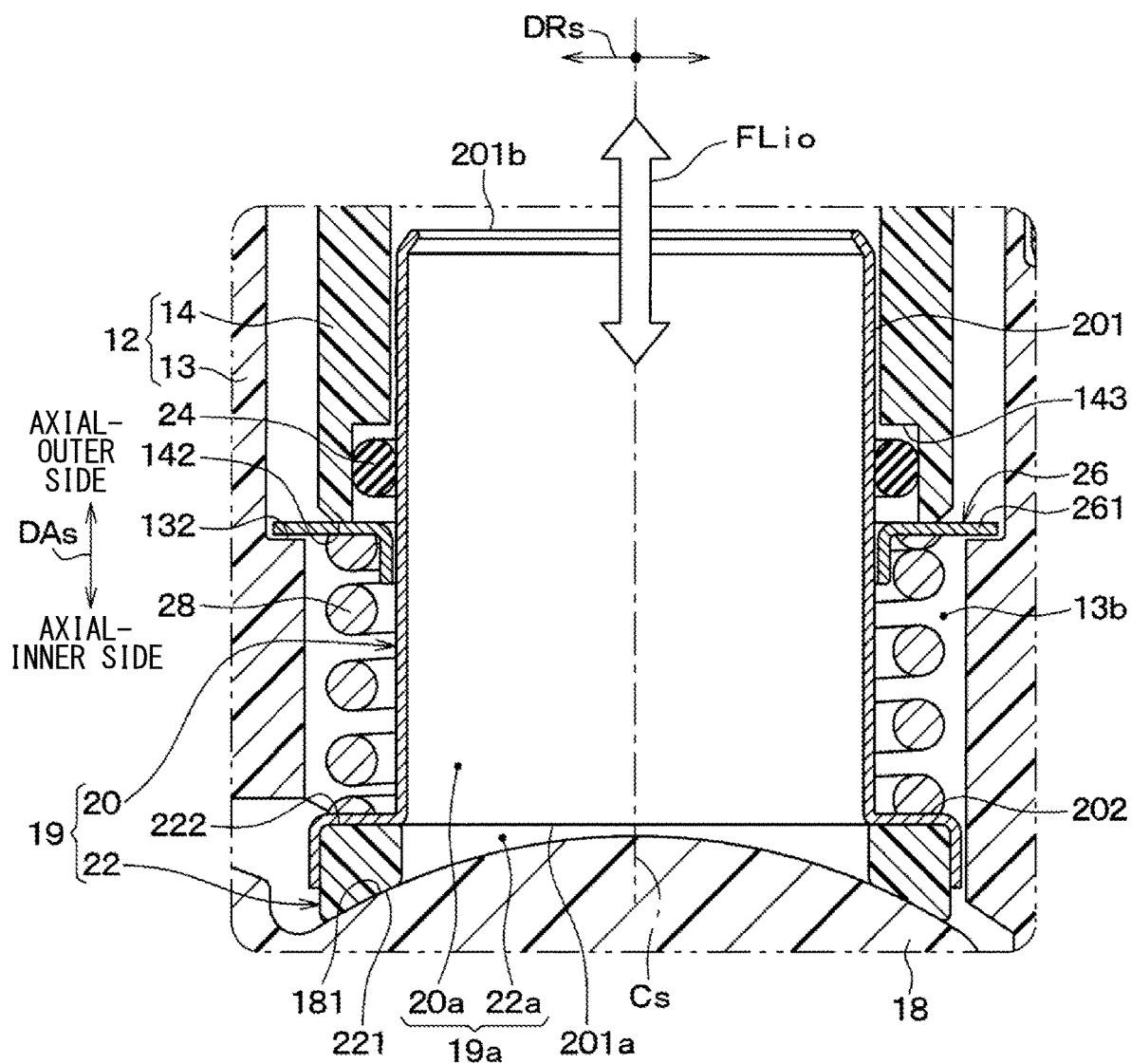
FIG. 12 is a schematically enlarged cross-sectional view showing a portion of a sixth embodiment, which corresponds to the portion III of FIG. 1.

As shown in FIG. 12, the sleeve sealing member 24 is composed of not the X-ring but an O-ring. The structure and operation of the sixth embodiment other than the above explained are the same to those of the fifth embodiment. The same advantages to those of the fifth embodiment can be also obtained in the sixth embodiment.

Seventh Embodiment

A seventh embodiment will be explained with reference to the drawing by focusing on differences between the first embodiment and the seventh embodiment.

Figure 13:
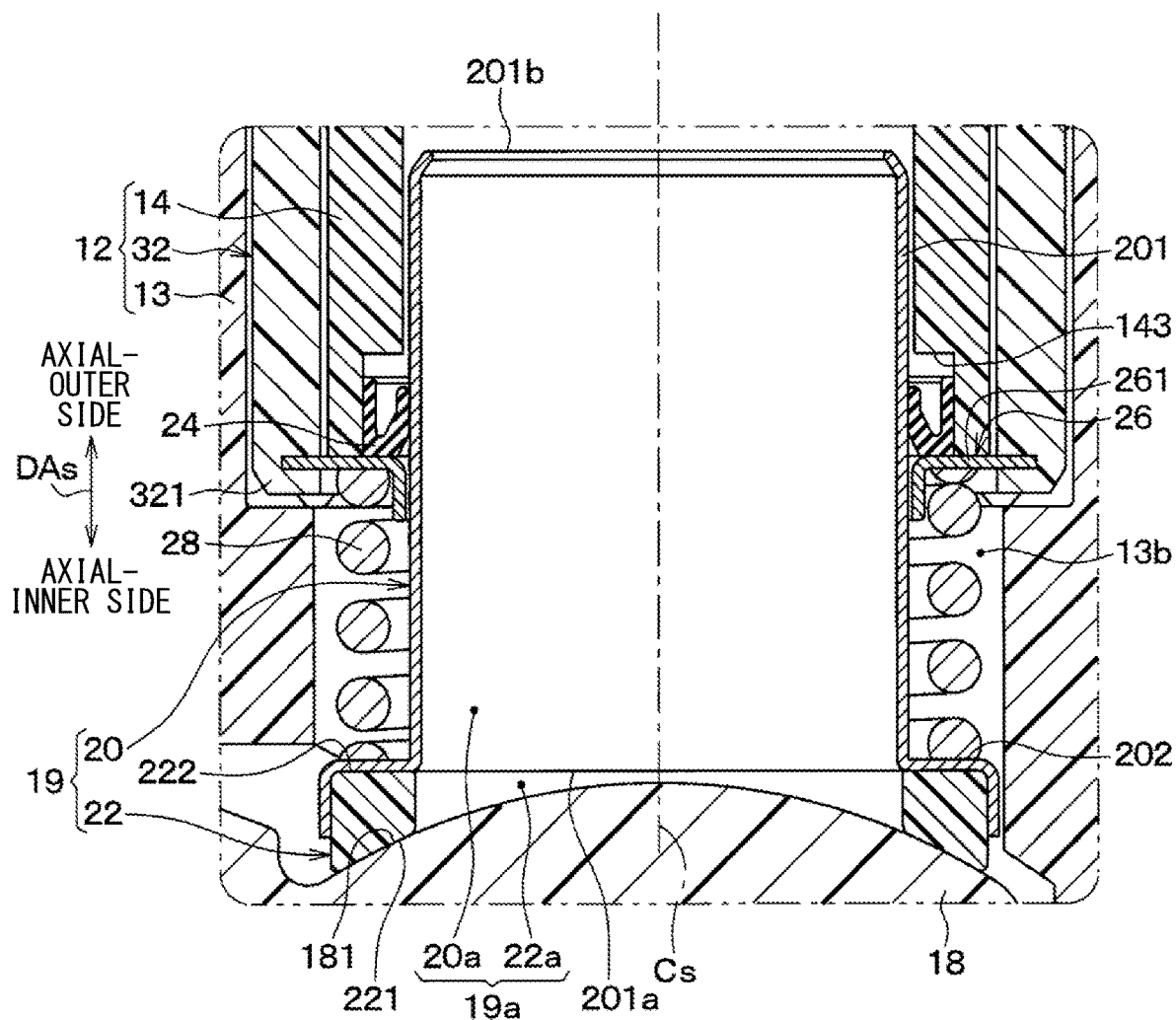
FIG. 13 is a schematically enlarged cross-sectional view showing a portion of a seventh embodiment, which corresponds to the portion III of FIG. 1.

As shown in FIG. 13, the valve housing 12 of the present embodiment has a connecting member 32 in addition to the housing body 13 and the spacer member 14.

The connecting member 32 is formed in a cylindrical shape and provided at an outside of the spacer member 14 in the sleeve radial direction DRs. The connecting member 32 is inserted into the sleeve accommodation hole 13b from the axial-outer end 13d (FIG. 1) of the sleeve accommodation hole 13b, together with the spacer member 14. The connecting member 32 is fixed to the housing body 13 by screws (not shown) or the like, together with the spacer member 14.

The connecting member 32 has a connecting portion 321 at an axial-inner end thereof in the sleeve axial direction DAs. The seal holding member 26 is connected to the connecting portion 321. More exactly, an outer peripheral end of the disc shape portion 261 of the seal holding member 26 is connected to the connecting portion 321. As above, the seal holding member 26 is connected to the valve housing 12, which includes the connecting member 32.

According to the above structure, since the seal holding member 26 is not displaced relative to the valve housing 12, a compression amount of the spring 28 is not changed, which may otherwise be changed if the seal holding member 26 is axially moved relative to the valve housing 12. As a result, it is possible to make the biasing force Fs of the spring 28 stable.

The structure and operation of the seventh embodiment other than the above explained are the same to those of the first embodiment. The same advantages to those of the first embodiment can be also obtained in the seventh embodiment.

Although the seventh embodiment is a modification of the first embodiment, the seventh embodiment can be combined to any one of the second to the sixth embodiments.

Eighth Embodiment

An eighth embodiment will be explained with reference to the drawing by focusing on differences between the first embodiment and the eighth embodiment.

Figure 14:
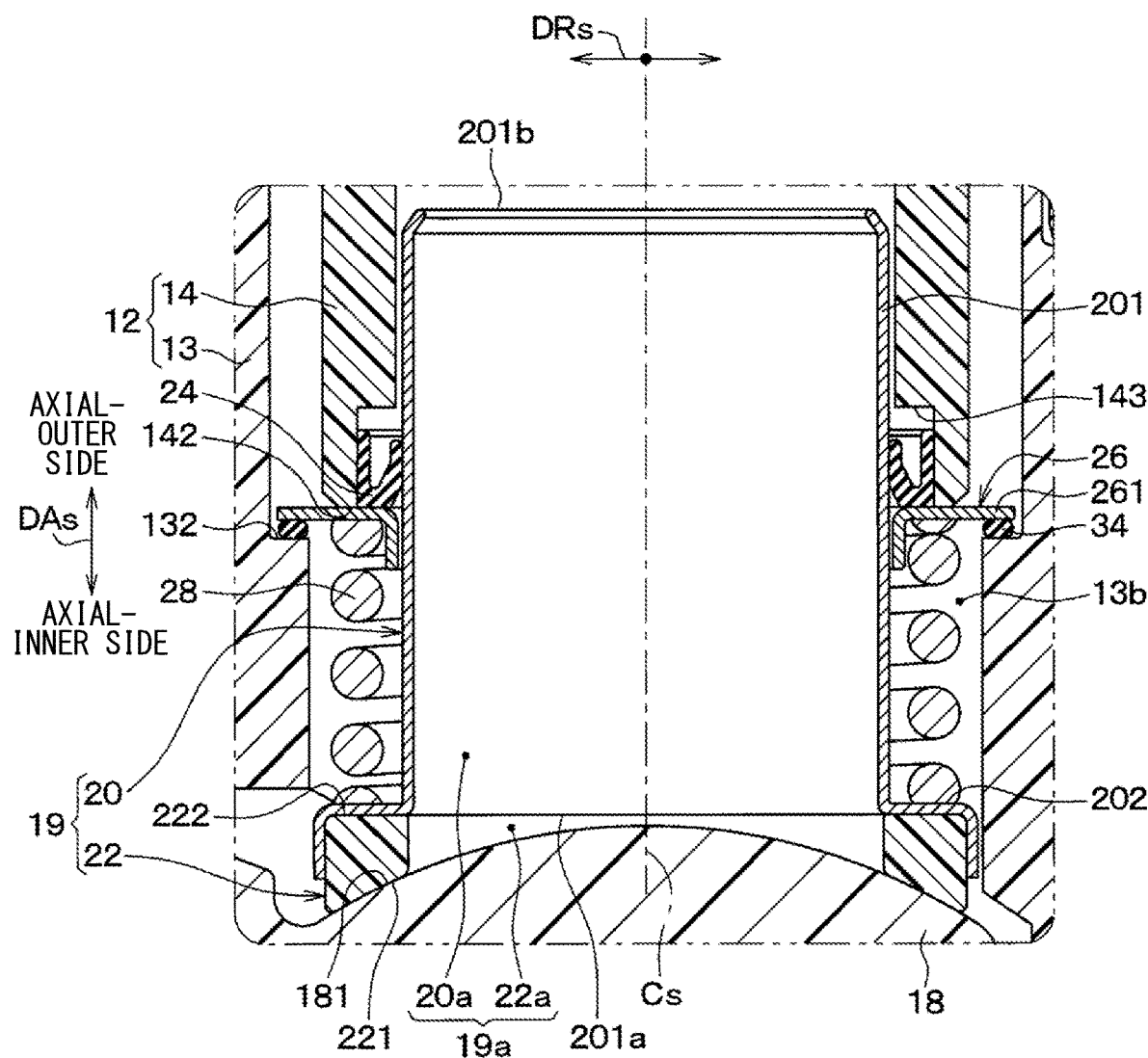
FIG. 14 is a schematically enlarged cross-sectional view showing a portion of an eighth embodiment, which corresponds to the portion III of FIG. 1.

As shown in FIG. 14, the valve device 10 of the present embodiment has a compressible member 34, which is made of elastic material, such as, rubber.

The compressible member 34 is formed in an annular shape extending in the circumferential direction around the sleeve center axis Cs. The compressible member 34 is located at a position between the plate supporting portion 132 of the housing body 13 and the seal holding member 26 in the sleeve axial direction DAs. More exactly, the compressible member 34 is interposed between the plate supporting portion 132 and the disc shape portion 261 of the seal holding member 26, which is axially opposed to the plate supporting portion 132.

The compressible member 34 is compressed by and between the plate supporting portion 132 and the disc shape portion 261 of the seal holding member 26. Therefore, the compressible member 34 is elastically deformed between them.

As above, the axial gap between the plate supporting portion 132 and the disc shape portion 261 of the seal holding member 26 in the sleeve axial direction DAs is plugged by the compressible member 34. It is, thereby, possible to make smaller a variation of the compression amount of the spring 28, which may be caused by the axial displacement of the seal holding member 26. Namely, it is possible to make the biasing force Fs of the spring 28 stable.

The structure and operation of the eighth embodiment other than the above explained are the same to those of the first embodiment. The same advantages to those of the first embodiment can be also obtained in the eighth embodiment.

Although the eighth embodiment is a modification of the first embodiment, the eighth embodiment can be combined to any one of the second to the sixth embodiments.

Further Embodiments and/or Modifications (M1) In the above embodiments, for example, as shown in FIG. 1, the valve device 10 has one flow-out port 131 and one flow-in port 141. However, the valve device 10 may have multiple flow-out ports or multiple flow-in ports. For example, the valve device is composed of a three-way valve or a four-way valve.

(M2) In the above embodiments, the fluid flowing through the valve device 10 is the cooling water. Any fluid other than the cooling water may be used. The fluid flowing through the valve device 10 may be gas.

(M3) In the above first embodiment, for example, as shown in FIG. 3, the plate supporting portion 132 is formed in the housing body 13 on the axial-inner side of a part of the seal holding member 26 (the outer peripheral portion thereof) in the sleeve axial direction DAs. However, the plate supporting portion 132 may be formed in such a way that it is opposed to an entire surface of the seal holding member 26 on the axial-inner side in the sleeve axial direction DAs.

(M4) In the above embodiments, for example, as shown in FIG. 1, the valve device 10 is composed of the ball-type valve, wherein the valve member is rotated around the valve center axis Cv to open or close the fluid flow passage. The valve device may be composed of any other types of the valves for opening or closing its fluid flow passage.

(M5) The present disclosure is not limited to the above embodiments and/or modifications but can be further modified in various manners without departing from a spirit of the present disclosure. The above embodiments and/or the modifications may be optionally combined to each other.

What is claimed is:

1. A valve device for increasing or decreasing a flow amount of fluid comprising:
   a valve housing;
   a movable unit movably provided in the valve housing in its axial direction and having a fluid flow passage extending in the axial direction so that the fluid flows through the fluid flow passage, the movable unit further having a valve seat surface formed around a seat opening portion which is formed at an axial-inner end of the fluid flow passage in the axial direction;
   a valve member rotatably provided in the valve housing and having a valve surface, which is opposed to and in contact with the valve seat surface in the axial direction, wherein the valve member operatively opens or closes the seat opening portion; and a biasing member for generating a biasing force to bias the movable unit in the axial direction to the valve member, so that the biasing member pushes the valve seat surface to the valve surface by the biasing force, wherein the fluid flows through the fluid flow passage from an axial-outer side to an axial-inner side of the axial direction when the valve member opens the seat opening portion, wherein the movable unit has a first pressure receiving surface and a second pressure receiving surface, wherein the first pressure receiving surface receives a first fluid pressure from the fluid in the axial direction opposite to a direction of the biasing force, when the valve member closes the seat opening portion, wherein the second pressure receiving surface receives a second fluid pressure from the fluid in the axial direction opposite to a direction of the first fluid pressure, when the valve member closes the seat opening portion, wherein a first surface area and a second surface area is equal to each other, wherein each of the first surface area and the second surface area is an area of a projected portion on a virtual plane perpendicular to the axial direction, wherein each of the projected portions is obtained when each of the first and the second pressure receiving surfaces is projected to the virtual plane in the axial direction, wherein the valve device further comprises:

a sleeve sealing member of an annular shape; and a seal holding member for holding the sleeve sealing member on an axial-inner side of the sleeve sealing member, wherein the movable unit includes a cylindrical portion extending in the axial direction and forming the fluid flow passage in an inside of the cylindrical portion, wherein the valve housing has;

a spacer member provided at an outside of the cylindrical portion in a radial direction thereof and surrounding the cylindrical portion; and a plate supporting portion formed at a position of an axial-inner side of the seal holding member and opposing to a part of the seal holding member in the axial direction, wherein the sleeve sealing member is arranged at the outside of the cylindrical portion in the radial direction for sealing a radial gap between the cylindrical portion and the spacer member, and wherein the plate supporting portion restricts a movement of the sleeve sealing member in the axial direction to the axial-inner side, when the sleeve sealing member is brought into contact with the plate supporting portion.

2. The valve device according to claim 1, wherein the movable unit includes a seat holding portion extending from the cylindrical portion in a radial outward direction thereof, the biasing member is composed of a spring, which is arranged at an axial-inner side of the seal holding member, and the biasing member is held between the seal holding member and the seat holding portion in a compressed condition in the axial direction.

3. The valve device according to claim 1, wherein the movable unit includes a valve seat member having the valve seat surface, and the cylindrical portion is integrally formed with the valve seat member as one piece.

4. The valve device according to claim 1, wherein the sleeve sealing member is composed of an X-ring or an O-ring.

5. A valve device for increasing or decreasing a flow amount of fluid comprising:

a valve housing;

a movable unit movably provided in the valve housing in its axial direction and having a fluid flow passage extending in the axial direction so that the fluid flows through the fluid flow passage, the movable unit further having a valve seat surface formed around a seat opening portion which is formed at an axial-inner end of the fluid flow passage in the axial direction;

a valve member rotatably provided in the valve housing, and having a valve surface, which is opposed to and in contact with the valve seat surface in the axial direction, wherein the valve member operatively opens or closes the seat opening portion; and a biasing member for generating a biasing force to bias the movable unit in the axial direction to the valve member, so that the biasing member pushes the valve seat surface to the valve surface by the biasing force, wherein the fluid flows through the fluid flow passage from an axial-outer side to an axial-inner side of the axial direction when the valve member opens the seat opening portion, wherein the movable unit has a first pressure receiving surface and a second pressure receiving surface, wherein the first pressure receiving surface receives a first fluid pressure from the fluid in the axial direction opposite to a direction of the biasing force, when the valve member closes the seat opening portion, wherein the second pressure receiving surface receives a second fluid pressure from the fluid in the axial direction opposite to a direction of the first fluid pressure, when the valve member closes the seat opening portion, wherein a first surface area and a second surface area is equal to each other, wherein each of the first surface area and the second surface area is an area of a projected portion on a virtual plane perpendicular to the axial direction, wherein each of the projected portions is obtained when each of the first and the second pressure receiving surfaces is projected to the virtual plane in the axial direction, wherein the valve device further comprises:

a sleeve sealing member of an annular shape; and a seal holding member for holding the sleeve sealing member on an axial-inner side of the sleeve sealing member, wherein the movable unit includes a cylindrical portion extending in the axial direction and forming the fluid flow passage in an inside of the cylindrical portion, wherein the valve housing includes a spacer member provided at an outside of the cylindrical portion in a radial direction thereof and surrounding the cylindrical portion, wherein the sleeve sealing member is arranged at the outside of the cylindrical portion in the radial direction for sealing a radial gap between the cylindrical portion and the spacer member, and wherein the seal holding member is fixed to the valve housing.

6. A valve device for increasing or decreasing a flow amount of fluid comprising a valve housing;
a movable unit movably provided in the valve housing in its axial direction and having a fluid flow passage extending in the axial direction so that the fluid flows through the fluid flow passage, the movable unit further having a valve seat surface formed around a seat opening portion which is formed at an axial-inner end of the fluid flow passage in the axial direction;
a valve member rotatably provided in the valve housing and having a valve surface, which is opposed to and in contact with the valve seat surface in the axial direction, wherein the valve member operatively opens or closes the seat opening portion; and
a biasing member for generating a biasing force to bias the movable unit in the axial direction to the valve member so that the biasing member pushes the valve seat surface to the valve surface by the biasing force,
wherein the fluid flows through the fluid flow passage from an axial-outer side to an axial-inner side of the axial direction when the valve member opens the seat opening portion,
wherein the movable unit has a first pressure receiving surface and a second pressure receiving surface,
wherein the first pressure receiving surface receives a first fluid pressure from the fluid in the axial direction opposite to a direction of the biasing force, when the valve member closes the seat opening portion,
wherein the second pressure receiving surface receives a second fluid pressure from the fluid in the axial direction opposite to a direction of the first fluid pressure, when the valve member closes the seat opening portion,
wherein a first surface area and a second surface area is equal to each other,
wherein each of the first surface area and the second surface area s an area of a projected portion on a virtual plane perpendicular to the axial direction, wherein each of the projected portions is obtained when each of the first and the second pressure receiving surfaces is projected to the virtual plane in the axial direction,
wherein the valve device further comprises:
a sleeve sealing member of an annular shape;
a seal holding member for holding the sleeve sealing member on an axial-inner side of the sleeve sealing member; and
a compressible member made of elastic material,
wherein the movable unit includes a cylindrical portion extending in the axial direction and forming the fluid flow passage in an inside of the cylindrical portion,
wherein the valve housing has;
  a spacer member provided at an outside of the cylindrical portion in a radial direction thereof and surrounding the cylindrical portion; and
  a plate supporting portion formed at a position of an axial-inner side of the seal holding member and opposing to a part of the seal holding member in the axial direction,
wherein the sleeve sealing member is arranged at the outside of the cylindrical portion in the radial direction for sealing a radial gap between the cylindrical portion and the spacer member, and
wherein the compressible member is arranged between the plate supporting portion and the seal holding member in a condition that the compressible member is compressed by and between them in the axial direction.

7. A valve device for increasing or decreasing a flow amount of fluid comprising:

a valve housing;
a movable unit movably provided in the valve housing in its axial direction and having a fluid flow passage extending in the axial direction so that the fluid flows through the fluid flow passage, the movable unit further having a valve seat surface formed around a seat opening portion which is formed at an axial-inner end of the fluid flow passage in the axial direction;
a valve member rotatably provided in the valve housing and having a valve surface, which is opposed to and in contact with the valve seat surface in the axial direction, wherein the valve member operatively opens or closes the seat opening portion; and
a biasing member for generating a biasing force to bias the movable unit in the axial direction to the valve member, so that the biasing member pushes the valve seat surface to the valve surface by the biasing force,
wherein the fluid flows through the fluid flow passage from an axial-outer side to an axial-inner side of the axial direction when the valve member opens the seat opening portion,
wherein the movable unit has a first pressure receiving surface and a second pressure receiving surface,
wherein the first pressure receiving surface receives a first fluid pressure from the fluid in the axial direction opposite to a direction of the biasing force, when the valve member closes the seat opening portion,
wherein the second pressure receiving surface receives a second fluid pressure from the fluid in the axial direction opposite to a direction of the first fluid pressure, when the valve member closes the seat opening portion,
wherein a first surface area and a second surface area is equal to each other,
wherein each of the first surface area and the second surface area is an area of a projected portion on a virtual plane perpendicular to the axial direction, wherein each of the projected portions is obtained when each of the first and the second pressure receiving surfaces is projected to the virtual lane in the axial direction,
wherein the valve device further comprises:
a sleeve sealing member of an annular shape; and
a seal holding member for holding the sleeve sealing member on an axial-inner side of the sleeve sealing member,
wherein the movable unit includes;
  a cylindrical portion extending in the axial direction and forming the fluid flow passage in an inside of the cylindrical portion; and
  a seat holding portion extending from the cylindrical portion in a radial outward direction thereof,
wherein the valve housing includes;
  a spacer member provided at an outside of the cylindrical portion in a radial direction thereof and surrounding the cylindrical portion; and
  a plate supporting portion formed at a position of an axial-inner side of the seal holding member and opposing to a part of the seal holding member in the axial direction,
wherein the sleeve sealing member is arranged at the outside of the cylindrical portion in the radial direction for sealing a radial gap between the cylindrical portion and the spacer member, and
wherein the plate supporting portion is formed in the valve housing at an outside of the seat holding portion in the radial direction, and wherein the seal holding member extends in the radial outward direction from an inside contacting position at which the seal holding member is in contact with an axial-inner side of the sleeve sealing member to an outside contacting position at which the seal holding member is in contact with an axial-outer side of the plate supporting portion.

8. The valve device according to claim 7, wherein
the seat holding portion extends in the radial outward direction from an axial-inner side of the cylindrical portion,
the movable unit includes;
    a sleeve member having the cylindrical portion and the seat holding portion; and
    a valve seat member of an annular shape, wherein the valve seat member is compressed between the seat holding portion and the valve surface by the biasing force of the biasing member,
the valve seat member has an opposing surface axially opposed to the seat holding portion, and
the opposing surface has an annular pushing portion, which is formed in an annular shape and extends in a circumferential direction of the valve seat member, wherein the annular pushing portion is locally pushed strongly by the seat holding portion.

9. The valve device according to claim 7, wherein
the seat holding portion extends in the radial outward direction from an axial-inner side of the cylindrical portion,
the movable unit includes;
    a sleeve member having the cylindrical portion and the seat holding portion; and
    a valve seat member of an annular shape, wherein the valve seat member is compressed between the seat holding portion and the valve surface) by the biasing force of the biasing member), and
a seat spacer member is interposed between the seat holding portion and the valve seat member, wherein the seat spacer member is formed in an annular shape along the valve seat member and has a higher elasticity than that of the seat holding portion and the valve seat member.

\* \* \* \* \*